(12) United States Patent
Kroninger et al.

(10) Patent No.: US 7,668,230 B2
(45) Date of Patent: *Feb. 23, 2010

(54) NON-INTRUSIVE DIGITAL SUBSCRIBER LINE TRANSMIT ADJUSTMENT METHOD

(75) Inventors: Robert S. Kroninger, Wake Forest, NC (US); Dieter H. Nattkemper, Raleigh, NC (US); Laxman R. Anne, Raleigh, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 594 days.

This patent is subject to a terminal disclaimer.

(21) Appl. No.: 11/145,518

(22) Filed: Jun. 3, 2005

(65) Prior Publication Data

US 2006/0274824 A1    Dec. 7, 2006

(51) Int. Cl.
*H04L 5/16* (2006.01)
*H04B 1/38* (2006.01)
(52) U.S. Cl. .................................................. 375/219
(58) Field of Classification Search .................. 375/219
See application file for complete search history.

(56) References Cited

U.S. PATENT DOCUMENTS

| | | | |
|---|---|---|---|
| 6,314,135 B1 | 11/2001 | Schneider et al. | |
| 6,400,761 B1 | 6/2002 | Smee et al. | |
| 6,665,349 B1* | 12/2003 | Cherubini et al. | 375/261 |
| 6,667,991 B1 | 12/2003 | Tzannes | |
| 7,483,481 B1 | 1/2009 | Ghobrial et al. | |
| 2002/0105964 A1 | 8/2002 | Sommer et al. | |
| 2002/0106076 A1 | 8/2002 | Norrell et al. | |
| 2003/0063660 A1 | 4/2003 | Shenoi et al. | |
| 2003/0138251 A1* | 7/2003 | Jayaram et al. | 398/38 |
| 2004/0096022 A1 | 5/2004 | Zhang | |
| 2004/0125869 A1* | 7/2004 | May et al. | 375/219 |
| 2004/0203438 A1* | 10/2004 | Reynolds et al. | 455/67.11 |
| 2004/0252755 A1 | 12/2004 | Jaffe et al. | |
| 2005/0074070 A1 | 4/2005 | Betts | |
| 2005/0123028 A1 | 6/2005 | Cioffi et al. | |
| 2005/0129138 A1 | 6/2005 | Vaananen et al. | |
| 2005/0271075 A1* | 12/2005 | Cioffi et al. | 370/445 |
| 2006/0198430 A1 | 9/2006 | Rhee et al. | |
| 2006/0203896 A1* | 9/2006 | Clausen et al. | 375/219 |
| 2006/0221942 A1* | 10/2006 | Fruth et al. | 370/356 |
| 2006/0274825 A1 | 12/2006 | Cioffi et al. | |
| 2006/0285514 A1* | 12/2006 | Hoerl et al. | 370/328 |

(Continued)

OTHER PUBLICATIONS

"Hotwire Model 7925 Standalone E1 HDSL Termination Unit G.703 Interface User'S Guide," Document No. 7925-A2-GB22-00, Mar. 1998.*

(Continued)

*Primary Examiner*—David C Payne
*Assistant Examiner*—Nader Bolourchi
(74) *Attorney, Agent, or Firm*—Fogg & Powers LLC

(57) ABSTRACT

In one embodiment, a first device for communicating over a digital-subscriber-line (DSL) line comprises a digital-subscriber-line transceiver to transmit and receive data over the DSL link. A set of one or more performance parameters are associated with the DSL link by which the quality of the DSL link can be determined. The first device further comprises a controller coupled to the digital-subscriber-line transceiver. The controller causes a non-intrusive transmitter adjustment operation to be performed by the digital-subscriber-line transceiver.

47 Claims, 10 Drawing Sheets

U.S. PATENT DOCUMENTS

2007/0253496 A1* 11/2007 Giannakis et al. ........... 375/260

OTHER PUBLICATIONS

"Draft New Recommendation G.992.1: Asymmetrical Digital Subscriber Line (ADSL) Transceivers," Jun. 1999, Section 10.9.18.*
Adtran, "Run-Time Precoder Updates for HDSL2", "T1E1, Working Group T1E1.4 T1E1.4/98-288", Sep. 1998, Published in: San Antonio, TX.
Centrillon, "Iterative Spectrum Balancing for Digital Subscriber Lines", May 2005, pp. 1937-1941, Publisher: IEEE International Conference on Communication.
Cioffi, "Coordinated Level 2 DSM Results:Vectoring of Mulitple DSLS", Feb. 18, 2002.
Cioffi, "Autonomous DSM Mixture of Symmetric and Asymmetric Service: Bi-Directional Iterative Waterfilling (At Level 0 or At Leve", Feb. 18, 2002.
Cioffi, "Iterative Water-Filling for DSM ", Jul. 29, 2005.
Cioffi, "Proposed Scope and Mission for Dynamic Spectrum Management", Aug. 20, 2001.
Glavin, "A Time-Delayed DFE QAM Adaptive Precoder", "2004 IEEE International Conference on Communications", June 2004, pp. 2726-2730, vol. 5, Publisher: IEEE.
Glavin, "Equalization of a Dynamic Channel With Forward Error Correction Using an Adaptive Precoder", "IEEE International Conference on Communications ICC2002", Apr./May 2002, pp. 64-68, vol. 1, Publisher: IEEE.
Glavin, "Equalization of Digital Subscriber Lines Under Dynamic Channel Conditions", "Signal Processing", May 2004, pp. 853-864, vol. 84, No. 5.
ITU, "High Bit Rate Digital Subscriber Line (HDSL) Transceivers", Oct. 1998.
ITU, "Single-Pair High-Speed Digital Subscriber Line (SHDSL) Transeivers", Dec. 2003.
ITU, "Spitterless Asymmetric Digital Subscriber Line Transceviers 2 (Splitterless ADSL2)", Jul. 2002.
ITU, "Asymmetric Digital Subscriber Line (ADSL) Transceivers-Extended Bandwidth ADSL2 (ADSL2PLUS)", May 2003.
ITU, "Very High Speed Digital Subscriber Line Transceivers", Jun. 2004.
ITU, "Very High Speed Digital Subscriber Line Transceivers 2 (VDSL2)", Feb. 2006.
ITU, "Handshake Procedures for Digital Subscriber Line (DSL) Transceivers", Jul. 1999.
ITU, "Asymmetric Digital Subscriber Line Tranceivers 2 (ADSL2)", Jan. 2005.
ITU, "Overview of Digital Subscriber Line (DSL) Recommendations", Feb. 2001.
ITU, "Test Procedures for Digital Subscriber Line (DSL) Transceivers", Feb. 2001.
ITU, "Physcial Layer Management for Digital Subscriber Line (DSL) Transeivers", May 2003.
Kerpez, "DSL Spectrum Management Standard", Nov. 2002, pp. 116-123, Publisher: IEEE Communications Magazine.
Kerpez, "Advance DSL Management", Sep. 2003, pp. 116-123, Publisher: IEEE Communications Magazine.
Leshem, "Dynamtic FDM and Dynamic DS Power Back-Off: A Simplified DSM Algorithm for Coexistence Between RT and CO Based Deploymen", Nov. 17, 2002, Published in: USA.
McCaslin, "HDSL2 Performance With Run-Time Precoder Coefficient Updates", "T1E1.4 1998-217R1, T1E1.4", Jun. 1998.
Meehan, "An Adaptive Vector Quantized Flazible Precoder for a Dynamic Continuous Frequency Selective Mobile Channel", "IEEE Communications Letters", June 2000, pp. 196-198, vol. 4, No. 6, Publisher: IEEE.
Orckit, "Copper Truck HDSL Repeater", Dec. 17, 2000.
Song, "Dynamic Spectrum Management for Next-Generation DSL Systems", Oct. 2002, pp. 101-109, Publisher: IEEE Communications Magazine.

* cited by examiner

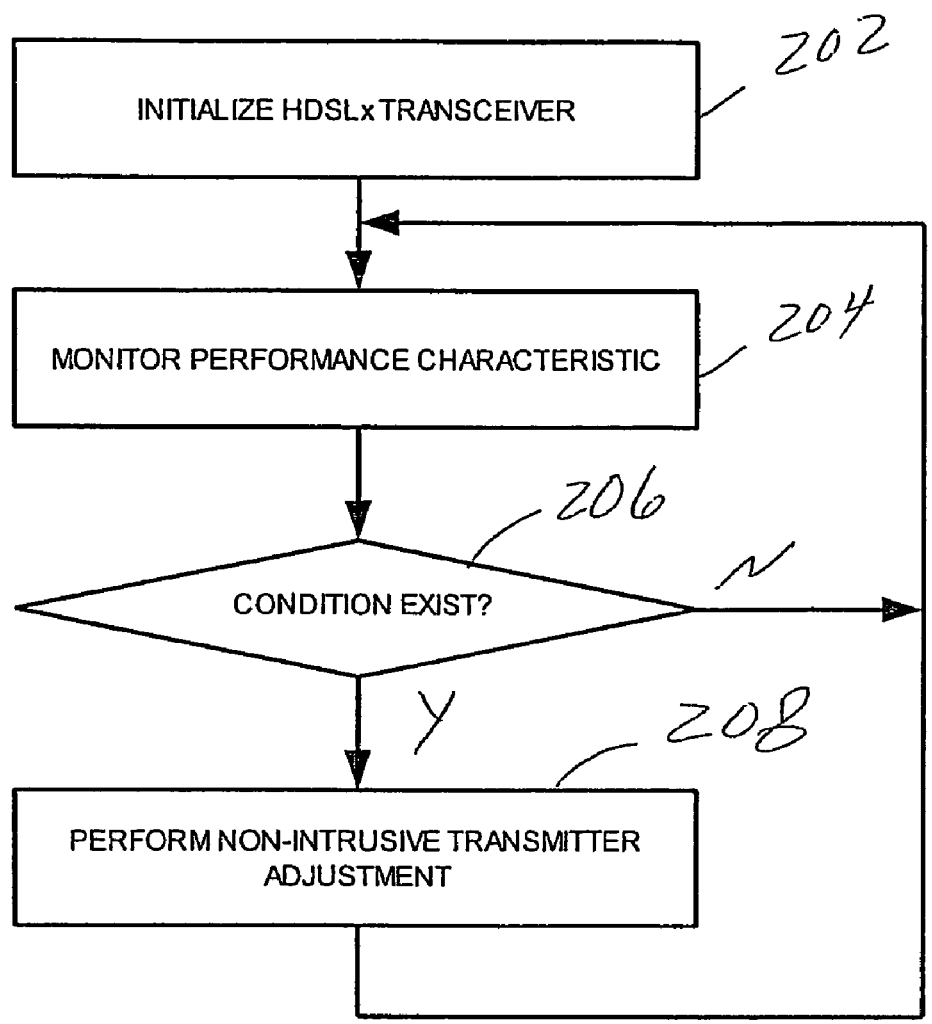

NON-INTRUSIVE DIGITAL SUBSCRIBER LINE TRANSMIT ADJUSTMENT METHOD

TECHNICAL FIELD

The following description relates to telecommunications in general and to digital-subscriber-line communication devices in particular.

BACKGROUND

The American National Standards Institute (ANSI) T1.418-2000 standard sets forth specifications for delivering symmetrical digital-subscriber-line (DSL) service at T1 rates over one copper twisted-pair lines (also referred to as "high-speed digital-subscriber-line 2 (HDSL2) service") and two copper twisted-pair telephone lines (also referred to "referred to as high-speed digital-subscriber-line 4 (HDSL4) service").

The ANSI T1.418-2000 standard specifies that, at the time a HDSL2 or HDSL4 line is initialized, various transmitter settings are to be optimized for the operational environment that exists at that particular time. Examples of transmitter settings that are typically optimized when such a DSL link is initialized include transmitter precoder coefficients and transmit power. After such a DSL link is initialized, the operational environment in which the line operates typically changes over time. It may be the case that the operational environment in which the line operates changes in a manner that causes the transmitter settings established during initialization to be suboptimal. Such suboptimal transmitter settings may result in the line having relatively poor signal-to-noise ratio margins (for example, 0 decibels (dB) to 1 dB) and/or a relatively high bit error rate (for example, as high as $10^{-4}$). The performance of the line in such a situation may result in customer complaints and/or a request for service.

Other xDSL technologies (SHDSL, ADSL, VDSL, and their variants) also optimize some of the transmitter settings during initialization. Of particular note is the transmit power setting. Most xDSL standards provide for a way to set the transmit power during initialization, but have no way to adjust the transmit power once the line is in data mode (also referred to as showtime). Over time, the transmit power may not be sufficient to overcome the noise environment.

One approach to resolving such a situation is to retrain the line when the performance of the line falls below a predefined performance threshold. Such an approach, however, takes the line out of service while the line is being retrained. As a result, the predefined performance threshold is typically set sufficiently low to avoid frequently retraining the line. However, the line will typically experience significant performance degradation before the performance threshold for triggering a retrain operation is reached. It may be the case that the operational environment for the line is such that the line operates for a significant period of time with significant performance degradation that is not sufficient to trigger a retrain of the line.

SUMMARY

In one embodiment, a first device for communicating over a digital-subscriber-line (DSL) line comprises a digital-subscriber-line transceiver to transmit and receive data over the DSL link. A set of one or more performance parameters are associated with the DSL link by which the quality of the DSL link can be determined. The first device further comprises a controller coupled to the digital-subscriber-line transceiver. The controller causes a non-intrusive transmitter adjustment operation to be performed by the digital-subscriber-line transceiver.

In another embodiment, a method comprises monitoring at least one performance parameter of a digital-subscriber-line link and determining when a predetermined performance condition for the digital-subscriber-line link exists. The predetermined performance condition is a function of the at least one performance parameter. The method further comprises, when the predetermined performance condition exists for the digital-subscriber-line link, performing a non-intrusive transmitter adjustment operation at a transceiver that communicates over the digital subscriber-line link.

In another embodiment, a first device for communicating over a digital-subscriber-line (DSL) link comprises a digital-subscriber-line transceiver to transmit and receive data over the DSL link. The first device further comprises a controller coupled to the digital-subscriber-line transceiver. The controller monitors at least one performance parameter of the DSL link and determines when a predetermined performance condition exists. The predetermined performance condition is a function of the at least one performance parameter. The controller, when the predetermined performance condition exists, causes a non-intrusive transmitter adjustment operation to be performed.

In another embodiment, a method comprises initially training a digital-subscriber-line (DSL) line over which a first device and a second device communicate. The method further comprises, after training the DSL link, monitoring at least one performance parameter of the DSL link and determining when a predetermined performance condition exists. The predetermined performance condition is a function of the at least one performance parameter. The method further comprises, when the predetermined performance condition exists, non-intrusively adjusting a transmit parameter of at least one of the first device and the second device.

The details of one or more embodiments of the claimed invention are set forth in the accompanying drawings and the description below. Other features and advantages will become apparent from the description, the drawings, and the claims.

DRAWINGS

FIG. 2 is a high-level flow diagram of one embodiment of a method of adjusting a transmit parameter of a DSL transceiver in a non-intrusive manner.

Like reference numbers and designations in the various drawings indicate like elements.

DETAILED DESCRIPTION

Figure 1:
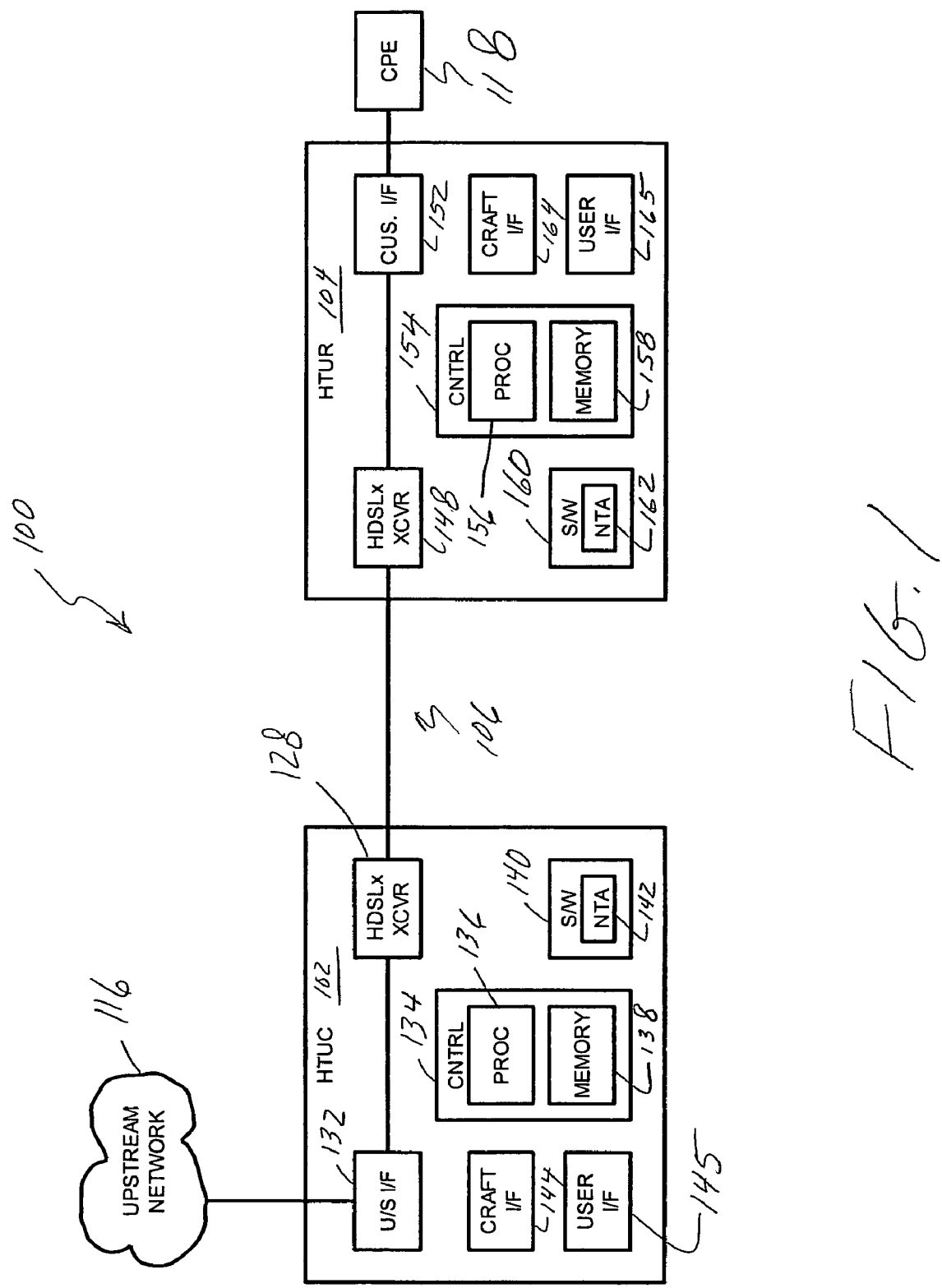
FIG. 1 is block diagram of one embodiment of a communication system.

FIG. 1 is block diagram of one embodiment of a communication system 100. The embodiment of a communication system 100 shown in FIG. 1 includes a central office transceiver unit (HTUC) 102 that communicates with a remote transceiver unit (HTUR) 104 over one or more high-speed, symmetrical DSL (HDSLx) links 106. The HTUC 102, in the embodiment shown in FIG. 1, is housed within a central office of a service provider and the HTUR 104 is typically located at the customer premise (for example, in a wiring closet). In the particular embodiment shown in FIG. 1, one HDSLx link 106 is provided between the HTUC 102 and the HTUR 104; in other embodiments, a different number of HDSLx links are provided between the HTUC 102 and the HTUR 104. In one implementation, each HDSLx link 106 is provisioned as an HDSL2 link using one copper twisted-pair telephone line. In another implementation, an HDSL4 circuit is provisioned using two HDSL4 links, each of which is implemented using a separate copper twisted-pair telephone line. In other implementations, each link 106 is implemented in other ways.

In the particular embodiment shown in FIG. 1, the HTUC 102 is coupled to an upstream network 116 such as the public switched telephone network (PSTN) and/or a data network such as the Internet. The HTUC 102 is coupled to the upstream network 116 using appropriate intermediary interfaces and/or devices (not shown in FIG. 1). In the particular embodiment shown in FIG. 1, the HTUR 104 is coupled to various items of customer premises equipment (CPE) 118 located at customer premises. The HTUR 104 is coupled to the customer premise equipment 118 using appropriate intermediary interfaces and/or devices (not shown in FIG. 1).

In the embodiment shown in FIG. 1, the HTUC 102 includes an HDSLx transceiver (XCVR) 128 that comprises appropriate componentry for communicatively coupling the HTUC 102 to the HDSLx link 106 and for communicating over the HDSLx link 106. The HDSLx transceiver 128 of the HTUC 102 is also referred to here as the "HTUC transceiver 128." The HTUC 102, in the embodiment shown in FIG. 1, also includes an upstream interface (U/S I/F) 132 for communicating with the upstream network 116. For example, in one embodiment, the upstream interface 132 of the HTUC 102 includes a T1 or E1 framer and line interface for communicating with the upstream network 116 over a DSX-1 line.

The HTUC 102 also includes a controller (CNTRL) 134. For example, in the embodiment shown in FIG. 1, the controller 134 includes a programmable processor (PROC) 136 (such as a microprocessor) and memory (MEM) 138. Memory 138 includes appropriate memory devices such as read-only memory (ROM), random access memory (RAM), and/or registers located in the programmable processor 136). The programmable processor 136 executes software (S/W) 140 (also referred to here as "embedded software" 140). The embedded software 140 comprises appropriate program instructions that, when executed by the processor 136, carry out at least a portion of the functionality described here as being performed by the controller 134. The program instructions are embodied on a processor-readable medium (for example, flash memory) from the program instruction are read by the processor 136 for execution thereby. During execution of the software 140 by the processor 136, at least a portion of the software 140 and any associated data structures are stored in memory 138.

The HTUC 102 also includes a craft interface (CRAFT I/F) 144. The craft interface 144 includes, for example, a universal asynchronous receiver-transmitter ("UART") that couples an RS-232 serial port to the controller 134. A user can connect a portable computer (or other data terminal) to the serial port and communicate with an embedded software 140 executing on the programmable processor 136. In the particular embodiment shown in FIG. 1, a user can also communicate with the embedded software 140 over an embedded operations channel carried among the data traffic handled by the HTUC 102. For example, in one usage scenario, a network management workstation is communicatively coupled to an ETHERNET local area network, which in turn communicatively couples the network management workstation to the upstream interface 132 of the HTUC 102 via appropriate intermediary interfaces and/or devices (not shown in FIG. 1).

Moreover, in the embodiment shown in FIG. 1, the HTUC 102 further comprises a user interface (USER I/F) 145 via which a user of the HTUC 102 is able to interact with the embedded software 140. In one implementation of such an embodiment, the user interface 145 comprises one or more buttons (or other switches) that are actuated by a user in order to supply input to the embedded software 140 and/or one or more light-emitting diodes (LEDs) for displaying information for the user.

In the embodiment shown in FIG. 1, the HTUR 104 includes a HDSLx transceiver (XCVR) 148 that comprises appropriate componentry for communicatively coupling the HTUR 104 to the HDSLx link 106 and for communicating over the HDSLx link 106. The HDSLx transceiver 148 of the HTUR 102 is also referred to here as the "HTUR transceiver 128." The HTUR 104, in the embodiment shown in FIG. 1, includes a customer interface (CUS. I/F) 152 for communicating with customer premise equipment 118. For example, in one embodiment, the customer interface 152 includes an interface for communicating with one or more telephony and/or data devices.

The HTUR 104 also includes a controller (CNTRL) 154. For example, in the embodiment shown in FIG. 1, the controller 154 includes a programmable processor (PROC) 156 (such as a microprocessor) and memory (MEM) 158. Memory 158 includes appropriate memory devices such as read-only memory (ROM), random access memory (RAM), and/or registers located in the programmable processor 156). The programmable processor 156 executes software (S/W) 160 (also referred to here as "embedded software" 160). The embedded software 160 comprises appropriate program instructions that, when executed by the processor 156, carry out at least a portion of the functionality described here as being performed by the controller 154. The program instructions are embodied on a processor-readable medium (for example, flash memory) from the program instruction are read by the processor 156 for execution thereby. During execution of the software 160 by the processor 156, at least a portion of the software 160 and any associated data structures are stored in memory 158.

The HTUR 104 also includes a craft interface (CRAFT I/F) 164. The craft interface 164 includes, for example, a universal asynchronous receiver-transmitter ("UART") that couples an RS-232 serial port to the controller 154. A user can connect a portable computer or other data terminal to the serial port and communicate with an embedded control program executing on the programmable processor 156. In the particular embodiment shown in FIG. 1, a user can also communicate with the embedded software 160 over an embedded operations channel carried among the data traffic handled by the HTUR 104. For example, in one usage scenario, the HTUR 104 communicates with a network management workstation.

Moreover, in the embodiment shown in FIG. 1, the HTUR 104 further comprises a user interface (USER I/F) 165 via which a user of the HTUR 104 is able to interact with the embedded software 160. In one implementation of such an embodiment, the user interface 165 comprises one or more buttons (or other switches) that are actuated by a user in order to supply input to the embedded software 160 and/or one or more LEDs for displaying information for the user.

The HDSLx transceivers 128 and 148 used in the HTUC 102 and HTUR 104, respectively, make use of sophisticated signal processing to overcome the attenuation and noise on the HDSLx link 106. HDSL2 and HDSL4 use a combination of decision feedback equalization (DFE) and Tomlinson precoding to overcome attenuation on the HDSLx link 106. The ANSI T1.418-2000 standard specifies that, at the time an HDSL2 or HDSL4 line is initially provisioned, the HDSLx transceivers 128 and 148 engage in a start-up training process (also referred to here as a "full train"). The ANSI T1.418-2000 standard specifies that decision feedback equalization be used during the start-up training process. During the start-up training process, DFE is used to determine line equalization characteristics. Before the HDSLx link 106 is fully activated and provisioned, each of the HDSLx transceivers 128 and 148 exchange DFE equalization coefficients. These coefficients are used to set the characteristics of the transmit precoder in the respective HDSLx transceivers 128 and 148. These coefficients are also referred to here as "precoder coefficients."

The ANSI T1.418-2000 standard defines a transmit power back-off process in which the transmit power of the transceiver 128 in the HTUC 102 can be reduced when there is sufficient signal-to-noise ratio margin. The transmit power of the HTUC transceiver 128 is reduced to attempt to reduce cross-talk among various copper twisted-pair telephone lines. The standard allows for two different modes of operation termed "default" and "enhanced". The enhanced mode offers a significant reduction in power on short loops compared to the default mode. However, it is often the case that a service provider, when provisioning an HDSLx link 106, does not make use of the enhanced mode of the ANSI standard. Although operating the HDSLx transceiver 128 at a lower transmit power at the time of initialization may result in an adequate signal-to-noise ratio margin, the environment in which such a HDSLx link 106 operates will change over time and that the lower transmit power may not result in an adequate signal-to-noise ratio margin at some later point in time. As a result, service providers often operate the HTUC transceiver 128 in the default mode, thereby avoiding the cross-talk reduction benefits associated with operating at a lower transmit power.

ITU standards G.991.2 (SHDSL), G.992.1 (ADSL), G.992.2 (splitterless ADSL), G.992.3 (ADSL2), G.992.4 (splitterless ADSL2), G.992.5 (ADSL2+), and G.993.1 (VDSL) all define a power back-off process in which the transmit power of the transceiver can be reduced when there is sufficient signal-to-noise ratio margin. Like HDSL, this power is fixed at initialization. A changing noise environment could lead to poor performance if the transmit power is set too low.

During normal operation (after the start-up process is complete and the HDSLx link 106 is provisioned), voice and/or data traffic intended for customer premise equipment 118 is communicated from the upstream network 116 to the upstream interface 132 of the HTUC 102 (via any intermediary interfaces and/or devices). The upstream interface 132 processes the received voice and/or data traffic and communicates it to the HDSLx transceiver 128 of the HTUC 102. The HDSLx transceiver 128 of the HTUC 102 assembles HDSLx frames that contain the voice and/or data traffic received from the upstream interface 132 and transmits the assembled HDSLx frames to the HTUR 104 over the HDSLx link 106.

The HDSLx transceiver 148 of the HTUR 104 receives the transmitted HDSLx frames from the HDSLx link 106. The HDSLx transceiver 148 of the HTUR 104 removes the voice and/or data traffic from the received HDSLx frames and forwards the removed voice and/or data traffic to the customer interface 152. The customer interface 152 of the HTUR 104 communicates the received voice and/or data traffic to appropriate customer premises equipment 118 (via any intermediary interfaces and/or devices).

Similarly, voice and/or data traffic intended for the upstream network 116 is communicated from the customer premises equipment 118 to the customer interface 152 of the HTUR 104. The customer interface 152 processes the received voice and/or data traffic and communicates it to the HDSLx transceiver 148 of the HTUR 104. The HDSLx transceiver 148 of the HTUR 104 assembles HDSLx frames that contain the voice and/or data traffic received from the customer interface 152 and transmits the assembled HDSLx frames to the HTUC 102 over the HDSLx link 106.

The HDSLx transceiver 128 of the HTUC 102 receives the transmitted HDSLx frames from the HDSLx link 106. The HDSLx transceiver 128 of the HTUC 102 removes the voice and/or data traffic from the received HDSLx frames and forwards the removed voice and/or data traffic to the upstream interface 132. The upstream interface 132 formats and communicates the received voice and/or data traffic to the upstream network 116 (via any intermediary interfaces and/or devices).

The HTUC 102 and the HTUR 104 include non-intrusive transmitter adjustment (NTA) functionality. That is, the HTUC 102 and the HTUR 104 include functionality for adjusting the operation of the HDSLx transceivers 128 and 148, respectively, for the current operating conditions while HDSLx service is being provided over the HDSLx link 106. The HDSLx link 106 is also referred to here as being in a "data mode" when HDLSx service is being provided over the HDSLx link 106. In the embodiment shown in FIG. 1, the embedded software 140 executed by the controller 134 of the HTUC 102 comprises NTA functionality 142 and the embedded software 160 executed by the controller 154 of the HTUR 104 comprises NTA functionality 162 that implement at least a portion of such NTA functionality.

The NTA functionality 142 and 162, in such an embodiment, supports the adjustment of at least two transmitter parameters—the precoder coefficients and the transmit power of the HDSLx transceivers 128 and 148 of the HTUC 102 and HTUR 104, respectively. In such an embodiment, the adjustment of the precoder coefficients occurs in a non-intrusive retrain (NIR) operation in which the precoder coefficients are updated based on the current line conditions while the HDSLx link 106 remains in data mode. The adjustment of the transmit power occurs in a dynamic power back-off operation (DPBO) in which the transmit power is adjusted (for example, by increasing or decreasing the transmit power of the respective transceiver) in order to achieve the desired performance criterion or criteria (for example, to achieve a particular signal-to-noise ratio) while the HDSLx link 106 remains in data mode. In other embodiments, the NTA functionality 142 and 162 supported by the HTUC 102 and HTUR 104 is implemented in other ways.

In the case of other xDSL technologies such as SHDSL, ADSL, VDSL and their variants, NTA functionality supports only the transmit power adjustment. The adjustment of the transmit power occurs in a dynamic power back-off operation (DPBO) in which the transmit power is adjusted (for example, by increasing or decreasing the transmit power of the respective transceiver) in order to achieve the desired performance criterion or criteria (for example, to achieve a particular signal-to-noise ratio) while the HDSLx link 106 remains in data mode.

In one embodiment, the performance of the HDSLx link 106 is measured at one of the HDSLx transceiver units (for example, at the HTUC 102) and such measurements are used to perform a non-intrusive transmitter adjustment at the other HDSLx transceiver unit (for example, at the HTUR 104). In such an embodiment, when one HDSLx transceiver unit determines, based on performance measurements made by that unit, that a non-intrusive transmitter adjustment should be made at the other HDSLx transceiver unit, the former HDSLx transceiver unit sends a command to the other HDSLx transceiver unit requesting that the other HDSLx transceiver unit perform a non-intrusive transmitter adjustment. The other HDSLx transceiver unit, in response to receiving the command, performs the requested non-intrusive transmitter adjustment and sends a status message to the first HDSLx transceiver unit indicating when the adjustment has completed. In other embodiments, such NTA functionality is implemented in other ways.

FIG. 2 is a high-level flow diagram of one embodiment of a method 200 of adjusting a transmit parameter of a DSL transceiver in a non-intrusive manner. The particular embodiment of method 200 shown in FIG. 2 is described here as being implemented in the system 100 of FIG. 1, though other embodiments are implemented in other ways (for example, in the system 600 of FIG. 6 described below). In one implementation of such an embodiment, at least a portion of the processing of method 200 is performed by the controller 134 of the HTUC 102 (for example, implemented using the NTA functionality 142 of the software 140) and/or the controller 154 of the HTUR 104 (for example, implemented using the NTA functionality 162 of the software 160).

Method 200 includes initializing an HDSLx transceiver (block 202). In one embodiment, initializing the HDSLx transceiver includes having the HDSLx transceiver execute the start-up training processing specified in an HDSLx standard such as the ANSI T1.418-2000 standard. For example, in one embodiment implemented using the system 100 of FIG. 1, the HTUC transceiver 128 and the HTUR transceiver 148 are initialized by performing a start-up training process. The start-up training process, among other things, determines precoder coefficients and transmit-power levels for the HTUC transceiver 128 and the HTUR transceiver 148 that are appropriate for the line conditions existing at the time the start-up training process is performed.

Method 200 also includes monitoring one or more performance characteristics of an HDSLx link (block 204). When a predetermined condition that is a function of the one or more monitored performance characteristics exists (block 206), a non-intrusive transmitter adjustment is made to a transmitter included in an HDSLx transceiver communicating over the monitored HDSLx link (block 208). For example, Section 7.3 and Annex G of the ANSI T1.418-2000 standard define basic performance parameters that can be used to characterize the performance of an HDSLx link. Examples of such performance parameters include cyclic redundancy check (CRC), loss of synch word (LOSW), loop attenuation, signal-to-noise ratio (SNR), errored seconds (ES), severely errored seconds (SES), and unavailable seconds (UAS).

The performance characteristics can be monitored by directly measuring such characteristics (for example, where the HDSLx transceiver includes functionality for automatically measuring such characteristics and for making the measurements available to the embedded software executed by the HDSLx transceiver unit) and/or by calculating such characteristics from other measured characteristics (for example, where the embedded software executed by the HDSLx transceiver unit calculates such a performance characteristic using measurements made available by the HDSLx transceiver). Whether a particular performance characteristic is measured by the HDSLx transceiver or calculated based on other measurements is typically an implementation detail dictated by the particular HDSLx transceiver chipset that is used.

In one embodiment, where the method 200 is implemented in the system 100 of FIG. 2, the embedded software 140 executing on the HTUC 102 includes a process that monitors one or more performance characteristic of the HDSLx link 106 by interacting with, among other things, the HTUC transceiver 128. When the process determines that a particular condition that is a function of one or more of the monitored performance characteristics exists (for example, when the performance of the HDSLx link 106 degrades below a particular performance threshold), the process initiates (for example, by sending an appropriate command to the HTUR 104) a non-intrusive transmitter adjustment operation in which the transmitter included in the HTUR transceiver 148 is adjusted while the HDSLx link 106 remains in data mode and without (at least initially) performing a full retrain. In other embodiments, one or more performance characteristic of an HDSLx link are monitored and/or one or more non-intrusive transmitter adjustment operations are performed elsewhere (for example, at an HTUR, at one or more doublers that are placed in between an HTUC and a HTUR, and/or at an external device such as a management workstation).

Although only a single NTA operation is shown in FIG. 2 as being performed when the predetermined performance condition exists, it is to be understood that in other embodiments multiple non-intrusive transmitter adjustment operations can be performed, for example, in succession until the performance of the HDSLx link improves by a desired amount.

Advantageously, this approach enables a HDSLx transmitter setting to be adjusted in an attempt to improve the performance of the HDSLx link without having to perform a full retrain or having to cease providing data service on the HDSLx link during the adjustment. When such an attempt is successful (for example, when the performance of the HDSLx link improves by a desired amount), a full retrain can be avoided. Where such an attempt is not successful, the full retrain can still be performed if appropriate (for example, if the performance of the HDSLx link does not improve by a desired amount or further deteriorates). Moreover, the use of an embodiment of method 200, which provides a means to adjust the transmit power level after the initial start-up training process without taking the HDSLx link out of data mode, enables service providers to make use of the enhanced power back-off mode specified by the ANSI T1.418-2000 standard since the transmit power can level be increased at a later time if necessary as a part of such non-intrusive transmitter adjustment processing. In this way, reductions in cross talk can be achieved where possible while still enabling the transmit power to be increased when necessary.

FIGS. 3A-3D are flow diagrams of one exemplary embodiment of a method 300 of automatically performing a non-intrusive transmitter adjustment. The embodiment of method 300 shown in FIGS. 3A-3D is described here as being implemented using the HTUC 102 of FIG. 1, though it is to be understood that other embodiments are implemented in other ways. The functionality of the embodiment of method 300 shown in FIGS. 3A-3D is implemented primarily in the embedded software 140 that executes on the programmable processor 136 of the controller 134 of the HTUC 102. It is to be understood that at least a portion of the functionality of method 300, in other embodiments, can be incorporated into the firmware and/or hardware of the HDSLx transceiver chipset or even by software external to the HDSL system such as that in a management system. In the particular embodiment shown in FIGS. 3A-3D, the HTUC 102, when appropriate, adjusts one or more transmitter parameters of the HTUR transceiver 148.

In the particular embodiment shown in FIGS. 3A-3D, the signal-to-noise ratio margin of the HDSLx link 106 and the errored second counts are monitored and used to determine when to adjust the transmitter parameters of the HTUR transceiver 148. The two transmitter parameters that can be adjusted as a part of NTA operations are the transmit power of the HTUR transceiver 148 and the precoder coefficients used by the HTUR transceiver 148. Updating the precoder coefficients is also referred to here as a "non-intrusive retrain" or "NIR."

When the HDSLx link 106 is in data mode (that is, when the HDSLx link 106 has been initialized and fully provisioned) (checked in block 302 of FIG. 3A), the HTUC 102 monitors the signal-to-noise ratio margin and the errored seconds count of the HDSLx link 106 (block 304). In one implementation, the HTUC 102 monitors the SNR margin and the ES count of the HDSLx link 106 using SNR margin and ES count data obtained by the transceiver chipset used to implement the HTUC transceiver 128. By monitoring its own transceiver 128 receive parameters, the HTUC 102 can use the information to affect change in the HTUR transceiver 148. In another implementation, the HTUC 102 monitors the SNR margin and the ES count of the HDSLx link 106 using SNR margin and ES count data obtained by the transceiver chipset used to implement the HTUR transceiver 148 of the HTUR 104 (for example, using data communicated to the HTUC 102 via an embedded operations channel communicated over the HDSLx link 106). By monitoring the HTUR transciever 148 receive parameters, the HTUC 102 can use the information to affect change in its own transceiver 128.

The HTUC 102 determines when the SNR margin of the HDSLx link 106 is below a minimum SNR margin threshold (block 306). The minimum SNR margin threshold value is a preset value, which may be provisionable by a user at run-time or may be fixed within the embedded software 140 (that is, not changeable at run-time). If the SNR margin is above the minimum SNR margin threshold, the HTUC 102 determines if the ES count of the HDSLx link 106 is above an ES count threshold (block 308). The ES count threshold is a preset value, which may be provisionable by a user at run-time or may be fixed within the embedded software 140. In one implementation, the ES count threshold is specified in the form of an error rate. In such an implementation, the ES count is monitored by determining the ES count for a period of time in order to calculate an error rate, which is used to determine whether the ES count threshold has been exceeded.

If the SNR margin is above the minimum SNR margin threshold and the ES count is below the ES count threshold, the HTUC 102 continues to monitor the SNR margin and the ES count while the HTUC 102 remains in data mode (looping back to block 302). If either the SNR margin is below the minimum threshold or the ES count is above the ES count threshold, the HTUC 102 checks if the transmit power of the HTUR transceiver 148 can be increased (block 310). In the embodiment shown in FIG. 3, the transmit power of the HTUR transceiver 148 can only be increased within the limits allowable by the hardware used to implement the transceiver 148. If the transmit power of the HTUR transceiver 148 can be increased, the HTUC 102 sends a message to the HTUR 104 that requests that the transmit power of the HTUR transceiver 148 be increased by 1 dB (block 312). The HTUC 102 then waits for an acknowledgement message from the HTUR 104 indicating that the transmit power of the HTUR transceiver 148 has been increased as requested (checked in block 314). When the acknowledgement is received, the SNR margin and the ES count are again monitored while the HTUC 102 remains in data mode (looping back to block 302).

If either the SNR margin is still below the minimum threshold or the ES count is still above the ES count threshold, the transmit power of the HTUR transceiver 148 is increased until both the SNR margin is above the minimum SNR margin threshold and the ES count is below the ES count threshold or until the transmit power of the HTUR transceiver 148 can no longer be increased. If either the SNR margin is still below the minimum threshold or the ES count is still above the ES count threshold and the transmit power of the HTUR transceiver 148 can no longer be increased, the HTUC 102 stores the current SNR margin value (for example, in memory 138) (block 316 of FIG. 3B) and a fail counter is cleared (block 318). Then, the HTUC 102 sends a message to the HTUR 104 requesting that the HTUR transceiver 148 initiate a NIR operation in order to update the precoder coefficients of the HTUR transceiver 148 (block 320). The HTUC 102 then waits for an acknowledgement indicating that the NIR operation finished (checked in block 322). When the acknowledgement is received, the HTUC 102 checks if the current SNR margin is better than the stored SNR margin (that is, if the SNR margin has improved after performing the NIR operation) (block 324). If the current SNR margin is better than the stored SNR margin, the SNR margin and the ES count are again monitored while the HTUC 102 remains in data mode (looping back to block 302 of FIG. 3A).

Figure 3A:
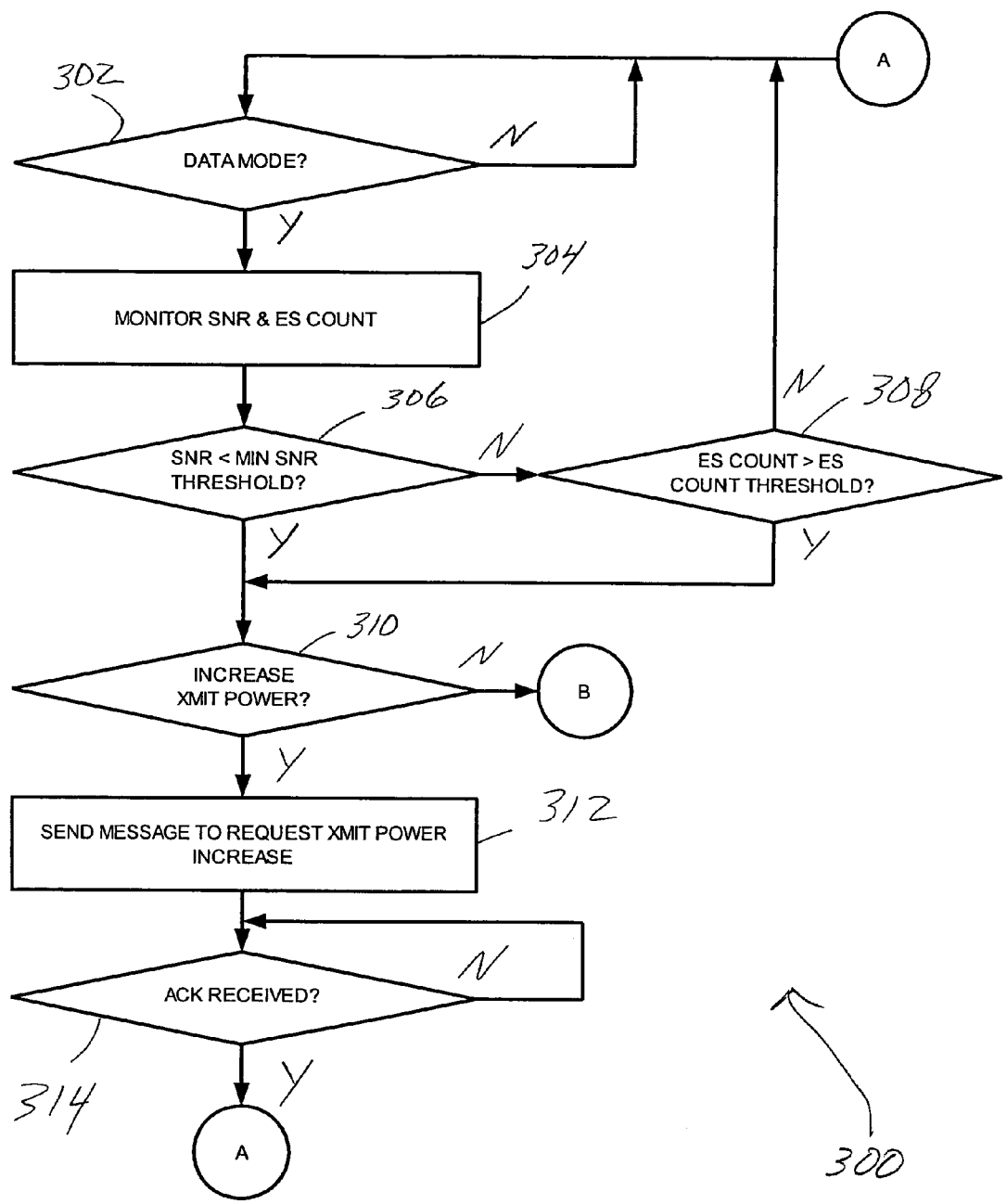
FIGS. 3A-3D are flow diagrams of one exemplary embodiment of a method of automatically performing a non-intrusive transmitter adjustment.
Figure 3B:
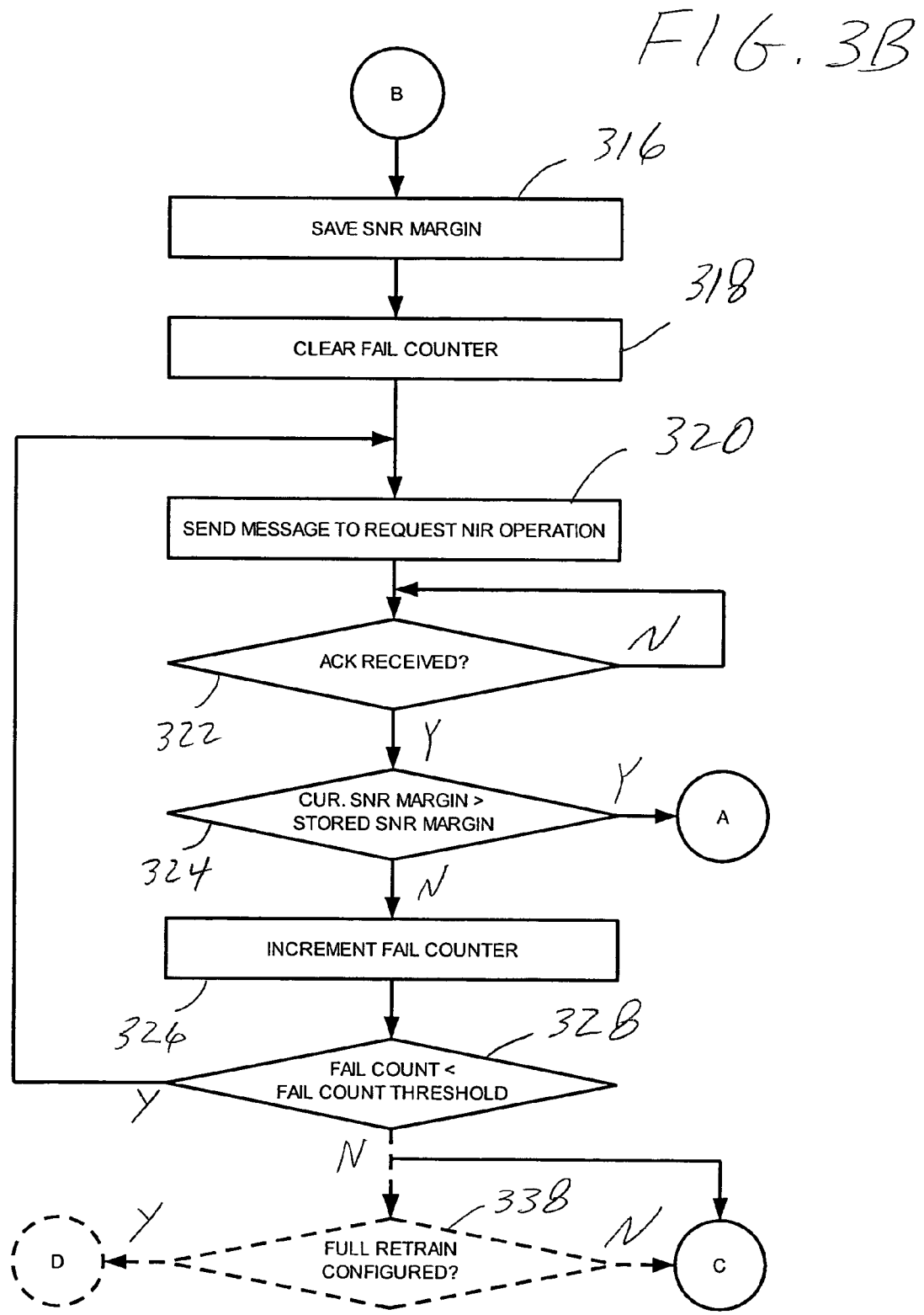
Figure 3C:
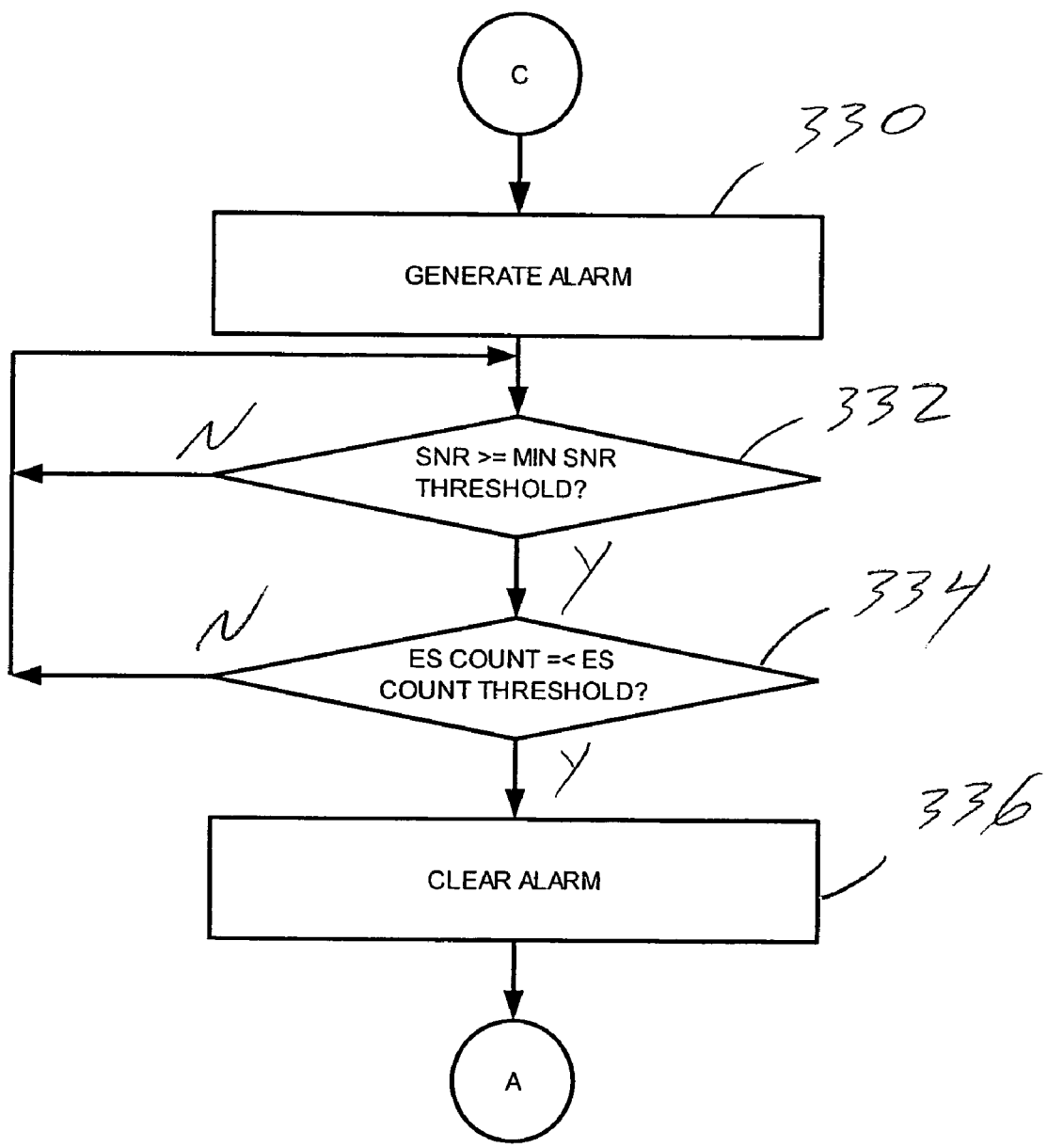
Figure 3D:
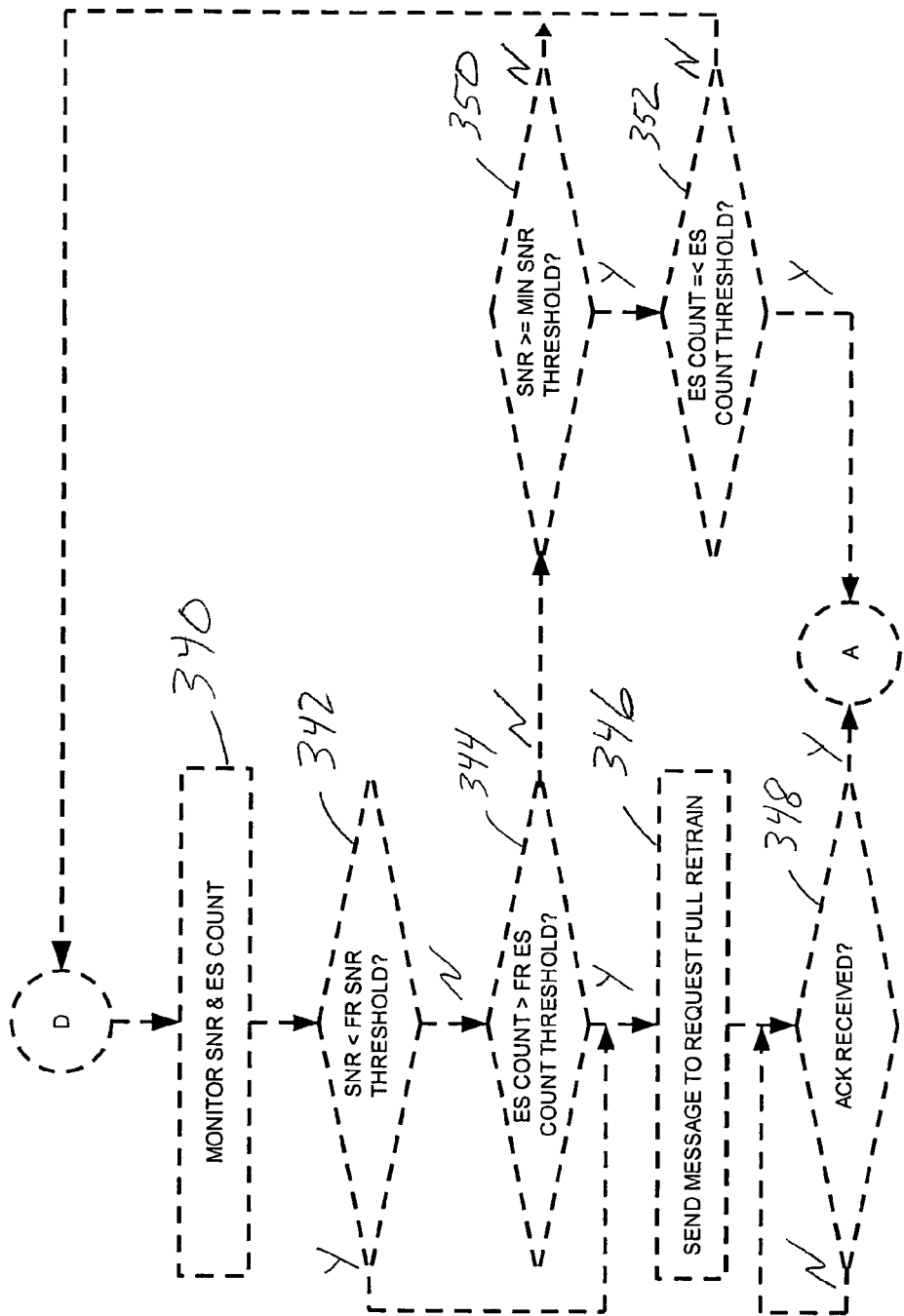

If the SNR margin has not improved, the failed counter is incremented (block 326 of FIG. 3B). The NIR failed count threshold is a preset value, which may be provisionable by a user at run-time or may be fixed within the embedded software 140. If the NIR failed counter is below a NIR failed count threshold (checked in block 328), the NIR operation is performed again (looping back to block 320 of FIG. 3A). When the NIR failed counter reaches the NIR failed count threshold, the HTUC 102 generates an alarm (block 330 of FIG. 3C). The HTUC 102 remains in the alarmed state until the current SNR margin is above the minimum SNR margin threshold (checked in block 332) and the ES count is below the ES count threshold (checked in block 334).

If the SNR margin is above the minimum SNR margin threshold and the ES count is below the ES count threshold, the HTUC 102 clears the NIR alarm (block 336) and continues to monitor the SNR margin and the ES count while the HTUC 102 remains in data mode (looping back to block 302 of FIG. 3A). If either the SNR margin is still below the minimum threshold or the ES count is still above the ES count threshold, the HTUC 102 remains in the alarm state (looping back to block 332 of FIG. 3C).

In another embodiment (illustrated in FIGS. 3A-3D using dashed lines), the HTUC 102 can be configured to cause the HTUR transceiver 148 to determine if a full retrain should be perform when the NIR failed counter reaches the NIR failed count threshold in addition to (or instead of) generating an alarm. In such an embodiment, when the NIR failed counter reaches the NIR failed count threshold, the HTUC 102 checks if the HTUC 102 has been configured to perform a full retrain (checked in block 338 of FIG. 3B). If the HTUC 102 has been configured to have the HTUR transceiver 148 perform a full retrain, the HTUC 102 monitors the SNR and ES count (block 340 of FIG. 3D).

If the SNR margin of the HDSLx link 106 is below a full-retrain SNR margin threshold (checked in block 342) or if the ES count of the HDSLx link 106 is above a full-retrain ES count threshold (checked in block 344), the HTUC 102 sends a message to the HTUR 104 requesting that the HTUR transceiver 148 perform a full retrain (block 346). The HTUC 102 then waits to receive an acknowledgement that the full retrain finished (checked in block 348) and then continues to monitor the SNR margin and the ES count while the HTUC 102 remains in data mode (looping back to block 302 of FIG. 3A). The full-retrain SNR margin and the full-retrain ES count are more restrictive than the minimum SNR margin and the minimum ES count threshold. That is, the full-retrain SNR threshold is less than the minimum SNR threshold and the full-retrain ES count threshold is more than the minimum ES count threshold. The full-retrain SNR margin threshold and full-retrain ES count threshold values are preset values, which may be provisionable by a user at run-time or may be fixed within the embedded software 140 (that is, not changeable at run-time).

If the SNR margin of the HDSLx link 106 is above a full-retrain SNR margin threshold and the ES count of the HDSLx link 106 is below a full-retrain ES count threshold, the HTUC 102 continues to monitor the SNR and ES count (looping back to block 342) until the SNR margin of the HDSLx link 106 is above the minimum SNR margin threshold (checked in block 350) and the ES count of the HDSLx link 106 is below the minimum ES count threshold (checked in block 352).

In another embodiment, FIGS. 3A-3D. can represent the flow diagram of an HTUC 102 algorithm which adjusts one or more transmitter parameters of its own transceiver 128. In this embodiment, the SNR margin and ES counts being monitored are those of the HTUR transceiver 148. In turn, the messages and acknowledgements of FIGS. 3A-3D are internal to the software 140 residing on the HTUC 102.

Figure 4:
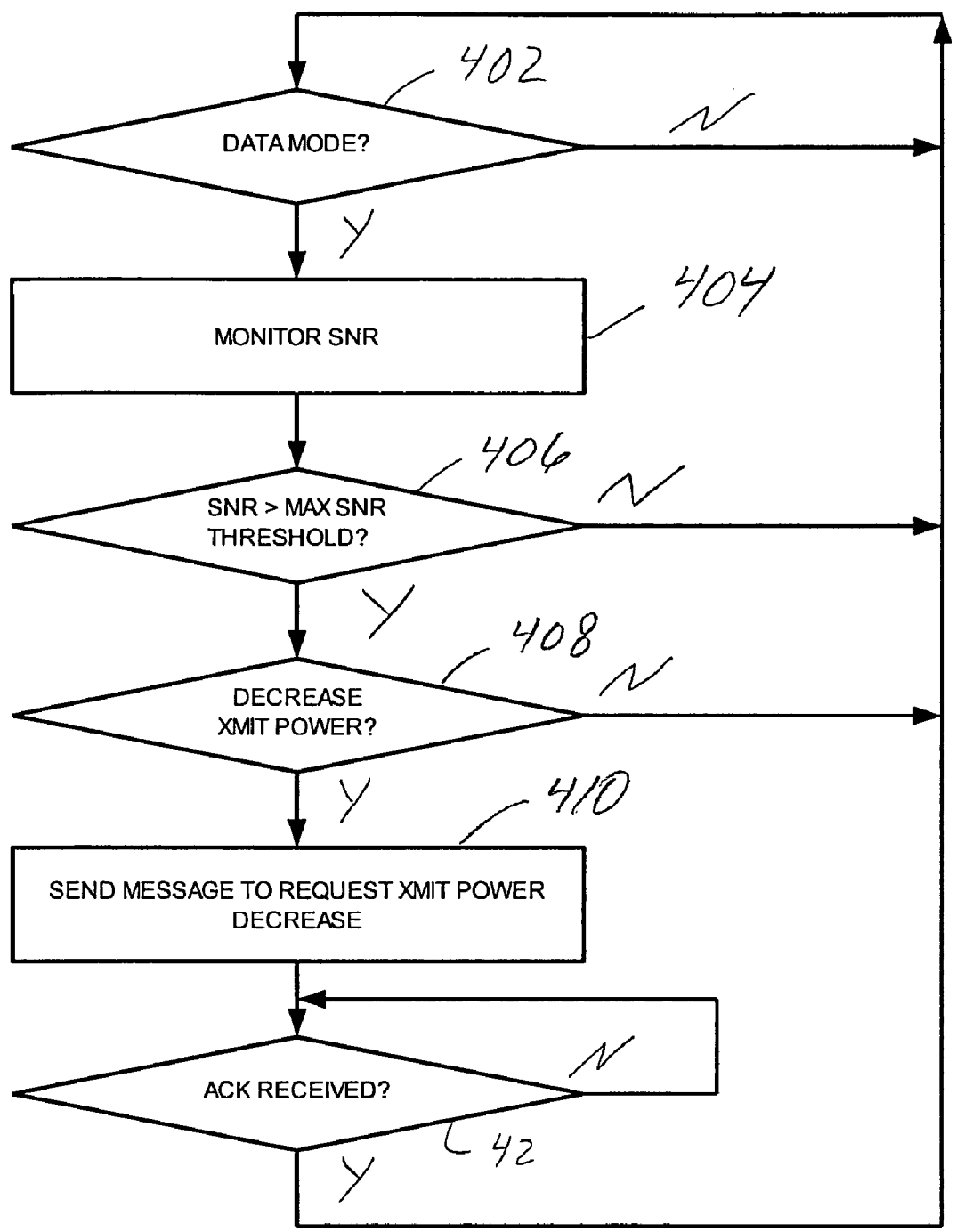
FIG. 4 is a block diagram of one embodiment of a method of automatically performing a non-intrusive transmitter adjustment.

Another use of the transmit power adjustment is to reduce the crosstalk when the SNR margin is sufficiently high. One example of such an embodiment is shown in FIG. 4. FIG. 4 is a block diagram of one embodiment of a method 400 of automatically performing a non-intrusive transmitter adjustment. The embodiment of method 400 shown in FIG. 4 is described here as being implemented using the HTUC 102 of FIG. 1, though it is to be understood that other embodiments are implemented in other ways. The functionality of the embodiment of method 400 shown in FIG. 4 is implemented primarily in the embedded software 140 that executes on the programmable processor 136 of the controller 134 of the HTUC 102. It is to be understood that at least a portion of the functionality of method 400, in other embodiments, can be incorporated into the firmware and/or hardware of the HDSLx transceiver chipset or even by software external to the HDSL system such as that in a management system. Also, it is to be understood the processing of method 400, in one implementation, is combined with the processing of method 300. In the particular embodiment shown in FIG. 4, the HTUC 102, when appropriate, adjusts transmit power of the HTUR transceiver 148.

When the HDSLx link 106 is in data mode (that is, when the HDSLx link 106 has been initialized and fully provisioned) (checked in block 402), the HTUC 102 monitors the signal-to-noise ratio margin of the HDSLx link 106 (block 404). In one implementation, the HTUC 102 monitors the SNR margin of the HDSLx link 106 using SNR margin data obtained by the transceiver chipset used to implement the HTUC transceiver 128. By monitoring its own transceiver 128 receive parameters, the HTUC 102 can use the information to request a decrease in the HTUR transceiver 148 transmitter power. In another implementation, the HTUC 102 monitors the SNR margin of the HDSLx link 106 using SNR margin data obtained by the transceiver chipset used to implement the HTUR transceiver 148 of the HTUR 104 (for example, using data communicated to the HTUC 102 via an embedded operations channel communicated over the HDSLx link 106). By monitoring the HTUR transceiver 148 receive parameters, the HTUC 102 can use the information to request a decrease in its own transceiver 128 transmitter power.

The HTUC 102 determines when the SNR margin of the HDSLx link 106 is above a maximum SNR margin threshold (block 406). The maximum SNR margin value is selected to correspond to a "good" SNR margin on the HDSLx link 106. The maximum SNR margin threshold value is a preset value, which may be provisionable by a user at run-time or may be fixed within the embedded software 140 (that is, not changeable at run-time).

If the SNR margin is not above the maximum SNR margin threshold, the HTUC 102 continues to monitor the SNR margin while the HTUC 102 remains in data mode (looping back to block 402). If the SNR margin is above the maximum SNR threshold, the HTUC 102 checks if the transmit power of the HTUR transceiver 148 can be decreased (block 408). In one implementation of such an embodiment, there is a minimum transmit power for the HTUR transceiver 148 and the transmit power of the transceiver 148 is not decreased below that minimum transmit power level. If the transmit power of the HTUR transceiver 148 can be decreased, the HTUC 102 sends a message to the HTUR 104 that requests that the transmit power of the HTUR transceiver 148 be decreased by 1 dB (block 410). In other embodiments, the transmit power of the transceiver 148 is decreased by other amounts. Decreasing the transmit power of the HTUR transceiver 148 when there is sufficient SNR margin on the HDSLx link 106 provides a mechanism to reduce crosstalk at the HTUR transceiver 148. The HTUC 102 then waits for an acknowledgement message from the HTUR 104 indicating that the transmit power of the HTUR transceiver 148 has been decreased as requested (checked in block 412). When the acknowledgement is received, the SNR margin is again monitored while the HTUC 102 remains in data mode (looping back to block 402).

In another embodiment, FIG. 4. can represent the flow diagram of an HTUC 102 algorithm which decreases the transmitter power of its own transceiver 128. In this embodiment, the SNR margin being monitored is that of the HTUR transceiver 148. In turn, the messages and acknowledgements of FIGS. 3A-3D are internal to the software 140 residing on the HTUC 102.

Figure 5A:
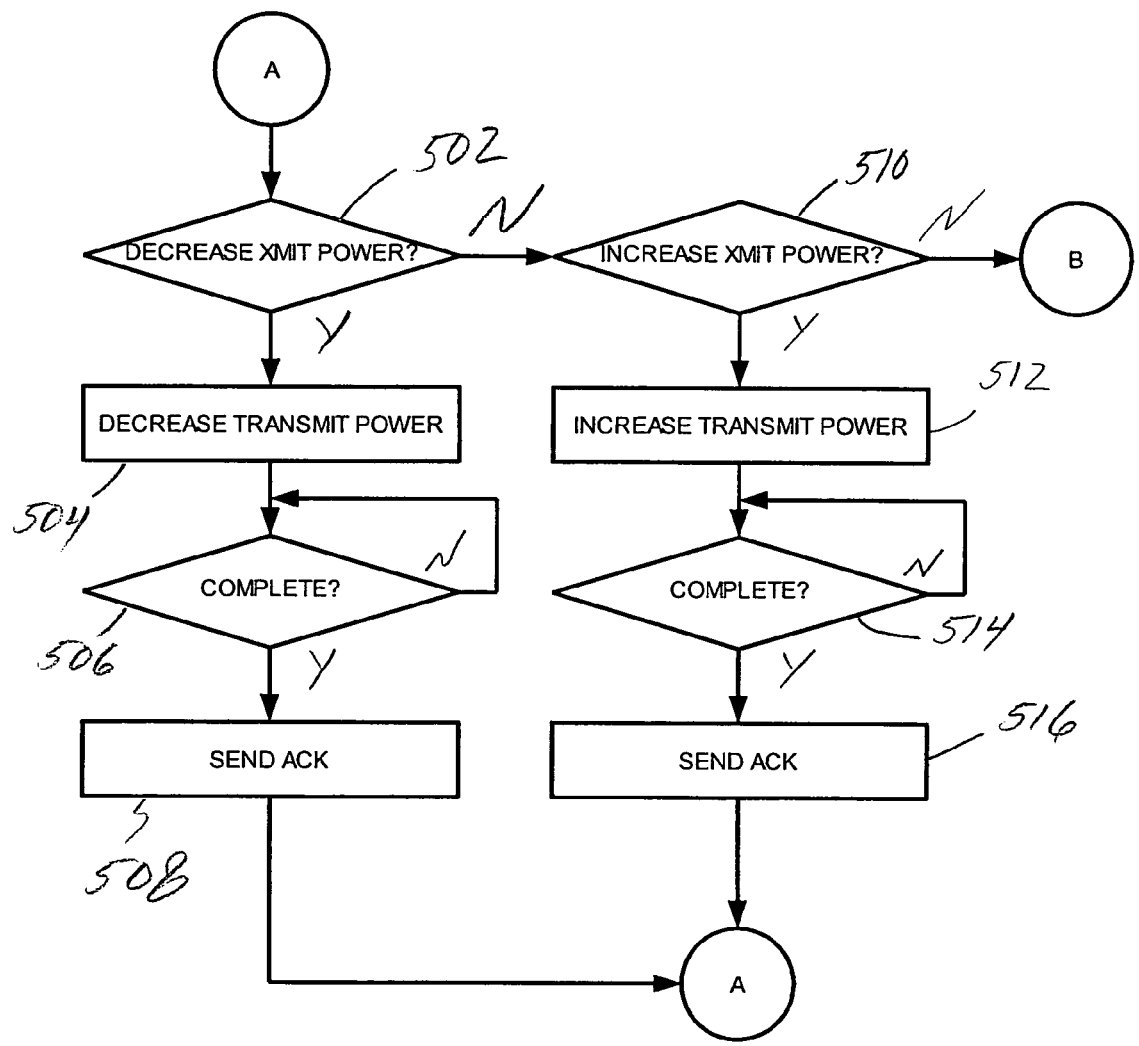
FIGS. 5A-5B are flow diagrams of one embodiment of a method of automatically performing a non-intrusive transmitter adjustment.
Figure 5B:
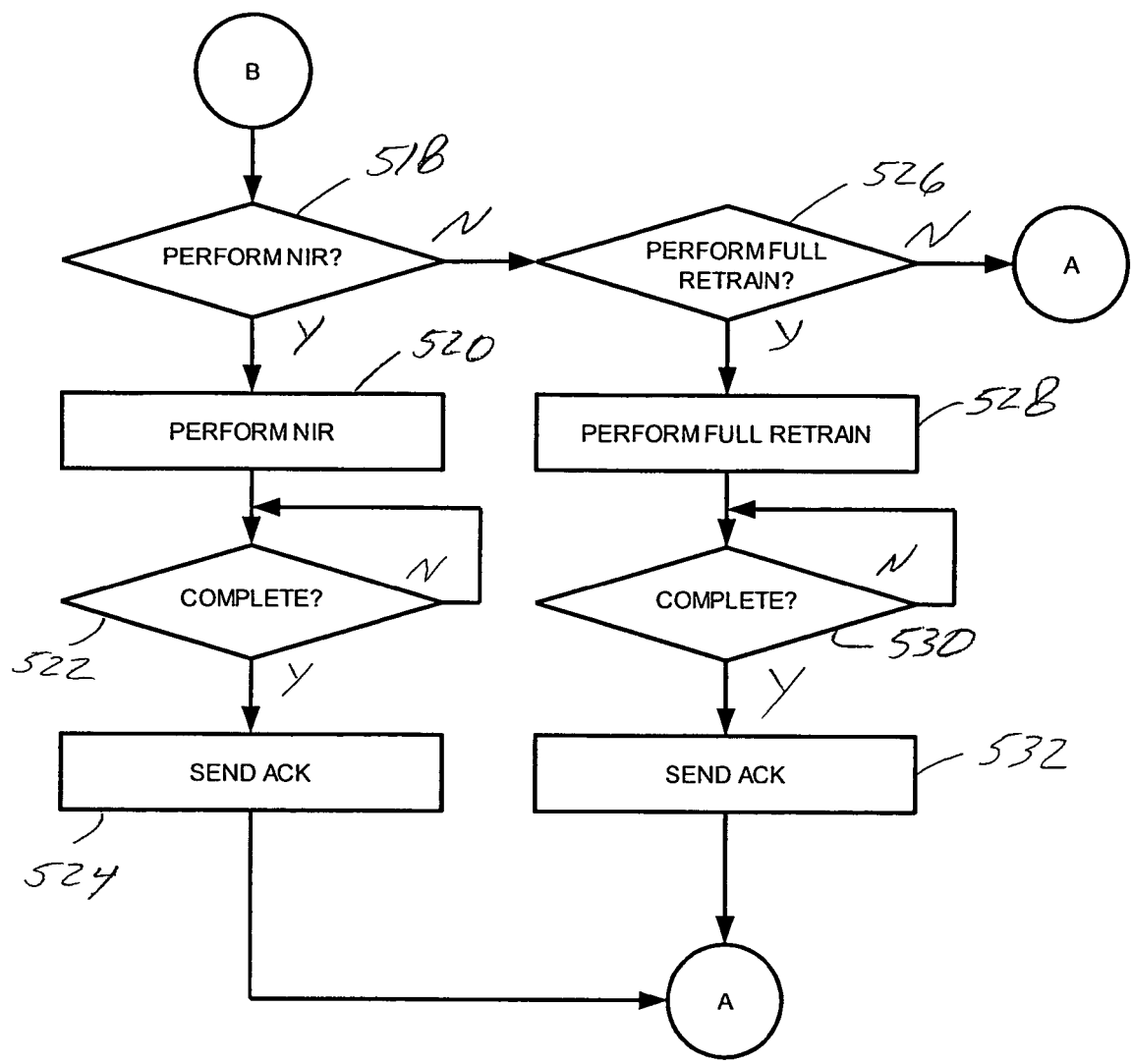

FIGS. 5A-5B are flow diagrams of one embodiment of a method 500 of automatically performing a non-intrusive transmitter adjustment. The embodiment of method 500 shown in FIGS. 5A-5B is described here as being implemented using the HTUR 104 of FIG. 1 and responds to messages transmitted by the HTUC 102 in the embodiment of method 300 shown in FIG. 3 and the embodiment of method 400 shown in FIG. 4, though it is to be understood that other embodiments are implemented in other ways and/or using other DSL transceivers.

The functionality of the embodiment of method 500 shown in FIGS. 5A-5B is implemented primarily in the embedded software 160 that executes on the programmable processor 156 of the controller 154 of the HTUR 104. It is to be understood that at least a portion of the functionality of method 500, in other embodiments, can be incorporated into the firmware and/or hardware of the HDSLx transceiver chipset in addition to the software 160. In the particular embodiment shown in FIGS. 5A-5B, the HTUR 104 adjusts one or more transmitter parameters of the HTUR transceiver 148 in response to messages received from the HTUC 102.

When the HTUR 104 receives a message requesting that the HTUR 104 decrease the transmit power of the HTUR transceiver 148 (checked in block 502 of FIG. 5A), the HTUR 104 decreases the transmit power of the HTUR transceiver 148 (block 504). Such an operation is also referred to here as a "dynamic power backoff operation" or "DPBO." In the particular embodiment shown in FIGS. 5A-5B, the HTUR 104 decreases the transmit power of the HTUR transceiver 148 by 1 decibel in response to such a message. In one implementation, the embedded software 160 interacts with the HDSLx transceiver chipset used to implement the HDSLx transceiver 148 (for example, via an appropriate driver) in order to decrease the transmit power of the HDSLx transceiver 148. When the HTUR transceiver 148 completes the operation (checked in block 506), the HTUR 104 sends an acknowledgement message back to the HTUC 102 indicating that the operation completed (block 508).

When the HTUR 104 receives a message requesting that the HTUR 104 increase the transmit power of the HTUR transceiver 148 (checked in block 510 of FIG. 5B), the HTUR 104 increases the transmit power of the HTUR transceiver 148 (block 512). Such an operation can be included as a part of dynamic power backoff operation. In the particular embodiment shown in FIGS. 5A-5B, the HTUR 104 increases the transmit power of the HTUR transceiver 148 by 1 decibel in response to such a message. In one implementation, the embedded software 160 interacts with the HDSLx transceiver chipset used to implement the HDSLx transceiver 148 (for example, via an appropriate driver) in order to increase the transmit power of the HDSLx transceiver 148. When the HTUR transceiver 148 completes the operation (checked in block 514), the HTUR 104 sends an acknowledgement message back to the HTUC 102 indicating that the operation completed (block 516).

When the HTUR 104 receives a message requesting that the HTUR 104 perform a non-intrusive retrain (NIR) operation (checked in block 518 of FIG. 5B), the HTUR 104 causes the HTUR transceiver 148 to perform a NIR operation (block 520). As used herein, a NIR operation comprises adjusting the precoder coefficients used in the transmitter of the HTUR transceiver 148 based on the current line conditions while the HDSLx link 106 remains in data mode and without otherwise performing a full retrain. In one implementation, the embedded software 160 executing on the HTUR 104 interacts with the HDSLx transceiver chip set used to implement the HDSLx transceiver 148 (for example, via an appropriate driver) in order to cause the HDSLx transceiver 148 to perform a NIR operation. When the HTUR transceiver 148 completes the operation (checked in block 522), the HTUR 104 sends an acknowledgement message back to the HTUC 102 indicating that the NIR operation completed (block 524).

When the HTUR 104 receives a message requesting that the HTUR 104 perform a full retraining operation (checked in block 526 of FIG. 5B), the HTUR 104 causes the HTUR transceiver 148 to perform a full retraining operation (block 528). In one implementation, the embedded software 160 executed by the HTUR 104 interacts with the HDSLx transceiver chipset used to implement the HDSLx transceiver 148 in order to cause the HDSLx transceiver 148 to perform a full retraining operation during which the HDSL link 106 is taken out of service. When the HTUR transceiver 148 completes the operation (checked in block 530), the HTUR 104 sends an acknowledgement message back to the HTUC 102 indicating that the full retrain operation completed (block 532).

In the embodiments shown in FIGS. 3-4 and 5A-5B involve the HTUC 102 monitoring the HDSLx link 106 and causing the HTUR 104 to adjust the operation the HTUR transceiver 148 when appropriate, in other embodiments such monitoring and adjustment are performed in other ways. For example, in one embodiment, the HTUR 104 monitors the HDSLx link 106 and causes the HTUC 102 to adjust the operation of the HTUC transceiver 128 when appropriate (for example, in the same general manner described above in connection with FIGS. 3-4 and FIGS. 5A-5B with the roles performed by the HTUC 102 and the HTUR 104 reversed). In another embodiment, one transceiver unit performs both the monitoring and adjustment operations (for example, where the HTUC 102 monitors the HTUR receive parameters of the HDSLx link 106 and adjusts the HTUC transceiver 128 when appropriate based on the condition of the HDSLx link 106 and/or where the HTUR 104 monitors the HTUC receive parameters of the HDSLx link 106 and adjusts the HTUR transceiver 148 when appropriate based on the condition of the HDSLx link 106). In another embodiment, a device external to the transceiver units (for example, a network or element management application executing on a management workstation) monitors the HDSLx link 106 and causes the HTUC transceiver 128 and/or the HTUR transceiver 148 to adjust its operation when appropriate based on the condition of the HDSLx link 106. In other embodiments, other types of devices are used.

More generally, the techniques and methods described here can be implemented in various system configurations in which a first device and a second device communicate digital-subscriber-line traffic (that is, data traffic) over a digital-subscriber-line link (such as an HDSLx link). For example, in one system configuration, a HTUC (or other central office digital-subscriber-line transceiver unit) communicates with a HTUR (or other remote digital-subscriber-line transceiver unit) over an HDSL2 link or over two HDSL4 links (or other digital-subscriber-line link). In another configuration, one or more doublers or repeaters are placed in the DSL communication path between an HTUC and a HTUR and the techniques and methods described here can be used to monitor each DSL link included in such DSL communication path (at any device included in the DSL communication path) and to adjust the operation of any transceiver that communicates on such DSL links.

Moreover, the determination as to when a non-intrusive transmitter adjustment is to be performed (for example, when a predetermined performance condition that is a function of a monitored performance characteristic exists) and the performing of the non-intrusive transmitter adjustment can be performed by various and different devices in such a system. For example, in one embodiment, the first device monitors a performance characteristic of the digital-subscriber-line link (for example, a SNR margin, an ES count, or some other performance characteristic) and determines when a predetermined performance condition that is a function of the monitored performance characteristic exists. In such an embodiment, when the predetermined performance characteristic exists, the first device causes the second device to perform a non-intrusive transmitter adjustment (for example, by sending a message from the first device to the second device over the digital-subscriber-line link).

In another embodiment, the first device monitors a performance characteristic of the digital-subscriber-line link and determines when a predetermined performance condition that is a function of the monitored performance characteristic exists. In such an embodiment, when the predetermined performance characteristic exists, the first device performs a non-intrusive transmitter adjustment.

In another embodiment, the first device obtains performance data about a digital-subscriber-line link and communicates such performance data to the second device (for example, over an embedded operations channel included in the digital-subscriber-line link) and the second device determines when a predetermined performance condition that is a function of the performance data exists. The second device performs a non-intrusive transmitter adjustment when the predetermined performance characteristic exists.

In another embodiment, the first device obtains performance data about a digital-subscriber-line link and communicates such performance data to the second device (for example, over an embedded operations channel included in the digital-subscriber-line link) and the second device determines when a predetermined performance condition that is a function of the performance data exists. The second device, when the predetermined performance characteristic exists, causes the first device to perform a non-intrusive transmitter adjustment (for example, by sending a message from the second device to the first device over the digital-subscriber-line link).

In another embodiment, the first device obtains performance data about a digital-subscriber-line link and communicates such performance data to a device external to the first and second devices (for example, a management workstation on which a management application executes). In such an embodiment, the external device determines when a predetermined performance condition that is a function of the performance data exists. The external device, when the predetermined performance characteristic exists, causes the first device to perform a non-intrusive transmitter adjustment (for example, by sending a message directly to the first device or via one or more intermediary devices).

In another embodiment, the first device obtains performance data about a digital-subscriber-line link and communicates such performance data to a device external to the first and second devices (for example, a management workstation on which a management application executes). In such an embodiment, the external device determines when a predetermined performance condition that is a function of the performance data exists. The external device, when the predetermined performance characteristic exists, causes the second device to perform a non-intrusive transmitter adjustment (for example, by sending a message directly to the second device or via one or more intermediary devices (for example, over the digital-subscriber-line link via the first device)).

Figure 6:
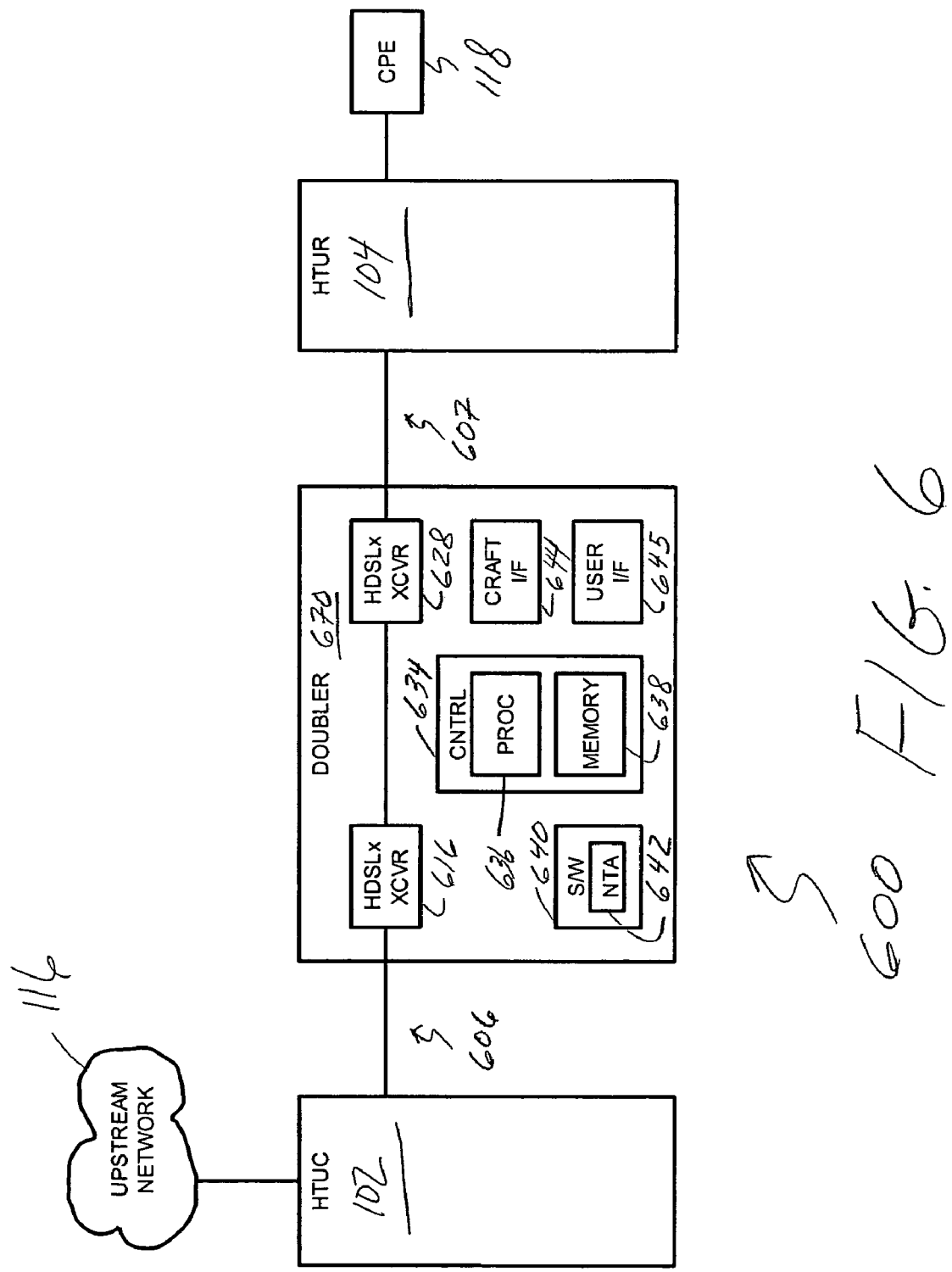
FIG. 6 is a block diagram of one embodiment of a communication system.

Another alternative embodiment is shown in FIG. 6. FIG. 6 is a block diagram of one embodiment of a communication system 600. The system 600 shown in FIG. 6 is similar to the system 100 of FIG. 1 except that a doubler (also referred to here as a "repeater") 670 is used in between the HTUC 102 and the HTUR 104. Those elements of the system 600 that are similar to the corresponding components shown in FIG. 1 are referenced in FIG. 6 using the same reference numeral used in FIG. 1.

In the embodiment shown in FIG. 6, the communication system 600 includes a HTUC 102 that communicates with a remote transceiver unit HTUR 104 via the doubler 670. The HTUC 102 is communicatively coupled to the doubler 670 over one or more HDSLx links 606. The doubler 670, in turn, is communicatively coupled to the HTUR 104 over one or more HDSLx links 607. In one application, the doubler 670 is used to extend the customer service area of the system 600 (that is, to extend the distance between the HTUC 102 and the CPE 118).

In the particular embodiment shown in FIG. 1, there is one HDSLx link 606 between the HTUC 102 and the doubler 670 and one HDSLx link 607 between the doubler 670 and the HTUR 104; in other embodiments, a different number of HDSLx links are provided between the HTUC 102 and the doubler 670 and between the doubler 670 and the HTUR 104. In one implementation, each HDSLx link 606 and HDSLx link 607 is provisioned as an HDSL4 link using two copper twisted-pair telephone lines. In other implementations, each HDSLx link 606 and HDSLx link 607 is implemented in other ways.

In the embodiment shown in FIG. 6, the doubler 670 includes an upstream HDSLx transceiver 616 that comprises appropriate componentry for communicatively coupling the doubler 670 to the HDSLx link 606 (and the HTUC 102) and for communicating over the HDSLx link 606. The doubler 670 also includes a downstream HDSLx transceiver 628 that comprises appropriate componentry for communicatively coupling the doubler 670 to the HDSLx link 607 (and the HTUR 104) and for communicating over the HDSLx link 607.

The doubler 670 also includes a controller 634. For example, in the embodiment shown in FIG. 6, the controller 634 includes a programmable processor 636 (such as a microprocessor) and memory 638. Memory 638 includes appropriate memory devices such as read-only memory (ROM), random access memory (RAM), and/or registers located in the programmable processor 636). The programmable processor 636 executes software 640 (also referred to here as "embedded software" 640). The embedded software 640 comprises appropriate program instructions that, when executed by the processor 636, carry out at least a portion of the functionality described here as being performed by the controller 634. The program instructions are embodied on a processor-readable medium (for example, flash memory) from which the program instructions are read by the processor 636 for execution thereby. During execution of the software 640 by the processor 636, at least a portion of the software 640 and any associated data structures are stored in memory 638. In one embodiment, the embedded software 640 includes at least a portion of the functionality described in connection with the embedded software 200 of FIG. 2.

The doubler 670 also includes a craft interface 644. The craft interface 644 includes, for example, UART that couples an RS-232 serial port to the controller 634. A user can connect a portable computer (or other data terminal) to the serial port and communicate with an embedded software 640 executing on the programmable processor 636. In the particular embodiment shown in FIG. 6, a user can also communicate with the embedded software 640 over an embedded operations channel carried among the data traffic handled by the doubler 670. For example, in one usage scenario, a network management workstation is communicatively coupled to an ETHERNET local area network, which in turn communicatively couples the network management workstation to the upstream interface 132 of the HTUC 102 via appropriate intermediary interfaces and/or devices (not shown in FIG. 6). In such a usage scenario, user interacts with a management application executing on the management workstation in order to interact with the doubler 670 via an embedded operations channel carried over the HDSLx link 606.

Moreover, in the embodiment shown in FIG. 6, the doubler 670 further comprises a user interface 645 via which a user of the doubler 670 is able to interact with the embedded software 640. In one implementation of such an embodiment, the user interface 645 comprises one or more buttons (or other switches) that are actuated by a user in order to supply input to the embedded software 640 and/or one or more light-emitting diodes (LEDs) for displaying information for the user.

The upstream and downstream HDSLx transceivers 616 and 628 of the doubler 670, in the embodiment shown in FIG. 6, support the signal processing described above in connection of FIG. 1. In the system 600, during the start-up training process, DFE is used to determine line equalization characteristics for each of the HDSLx transceivers used in the system 600. Before the HDSLx link 606 is fully activated and provisioned, each of the HDSLx transceivers 128 and 616 exchange DFE equalization coefficients. Before the HDSLx link 607 is fully activated and provisioned, each of the HDSLx transceivers 628 and 148 exchange DFE equalization coefficients. These coefficients are used to set the precoder coefficients of the transmit precoder in the respective HDSLx transceivers 128, 616, 628, and 148.

During normal operation (after the start-up process is complete and the HDSLx links 606 and 607 are provisioned), voice and/or data traffic intended for customer premise equipment 118 is communicated from the upstream network 116 to the upstream interface 132 of the HTUC 102 (via any intermediary interfaces and/or devices). The upstream interface 132 processes the received voice and/or data traffic and communicates it to the HDSLx transceiver 128 of the HTUC 102. The HDSLx transceiver 128 of the HTUC 102 assembles HDSLx frames that contain the voice and/or data traffic received from the upstream interface 132 and transmits the assembled HDSLx frames to the doubler 670 over the HDSLx link 606.

The upstream HDSLx transceiver 616 of the doubler 670 receives the transmitted HDSLx frames from the HDSLx line 606 and forwards the received HDSLx frames to the downstream HDSLx transceiver 628, which transmits the received HDSLx frames to the HTUR 104 over the HDSLx link 607. The HDSLx transceiver 148 of the HTUR 104 receives the transmitted HDSLx frames from the HDSLx line 607. The HDSLx transceiver 148 of the HTUR 104 removes the voice and/or data traffic from the received HDSLx frames and forwards the removed voice and/or data traffic to the customer interface 152. The customer interface 152 of the HTUR 104 communicates the received voice and/or data traffic to appropriate customer premises equipment 118 (via any intermediary interfaces and/or devices).

Similarly, voice and/or data traffic intended for the upstream network 116 is communicated from the customer premises equipment 118 to the customer interface 152 of the HTUR 104. The customer interface 152 processes the received voice and/or data traffic and communicates it to the HDSLx transceiver 148 of the HTUR 104. The HDSLx transceiver 148 of the HTUR 104 assembles HDSLx frames that contain the voice and/or data traffic received from the customer interface 152 and transmits the assembled HDSLx frames to the doubler 670 over the HDSLx link 607.

The downstream HDSLx transceiver 628 of the doubler 670 receives the transmitted HDSLx frames from the HDSLx line 607 and forwards the received HDSLx frames to the upstream HDSLx transceiver 616, which transmits the HDSLx frames to the HTUC 102 over the HDSLx link 606. The HDSLx transceiver 128 of the HTUC 102 receives the transmitted HDSLx frames from the HDSLx link 606. The HDSLx transceiver 128 of the HTUC 102 removes the voice and/or data traffic from the received HDSLx frames and forwards the removed voice and/or data traffic to the upstream interface 132. The upstream interface 132 formats and communicates the received voice and/or data traffic to the upstream network 116 (via any intermediary interfaces and/or devices).

The doubler 670 includes non-intrusive transmitter adjustment (NTA) functionality of the type supported by the HTUC 102 and the HTUR 104. That is, the doubler 670 includes functionality for adjusting the operation of the HDSLx transceivers 616 and 628, respectively, for the current operating conditions while HDSLx service is being provided over the HDSLx links 606 and 607, respectively. In the embodiment shown in FIG. 6, the embedded software 640 executed by the controller 634 of the doubler 670 comprises NTA functionality 642 that implements at least a portion of such NTA functionality.

The NTA functionality 642, in such an embodiment, supports the adjustment of at least two transmitter parameters—the precoder coefficients and the transmit power of the HDSLx transceivers 616 and 628 of the doubler 670. In such an embodiment, the adjustment of the precoder coefficients for a particular one of the transceiver 616 or 628 occurs in a NIR operation in which the precoder coefficients are updated based on the current line conditions while the HDSLx link 606 or 607, respectively, remains in data mode. The adjustment of the transmit power occurs in a dynamic power back-off operation in which the transmit power is adjusted (for example, by increasing or decreasing the transmit power of the respective transceiver) in order to achieve the desired performance criterion or criteria (for example, to achieve a particular signal-to-noise ratio) while the HDSLx link 606 or 607 remains in data mode. In other embodiments, the NTA functionality 642 supported by the doubler 670 is implemented in other ways.

For example, in one usage scenario, the HTUC 102 monitors the performance of the HDSLx link 606 and/or HDSLx link 607 and causes the upstream HDSLx transceiver 616 and/or downstream HDSLx transceiver 628 to perform a non-intrusive transmitter adjustment when appropriate based on the performance of the HDSLx link 606 or the HDSLx link 607. In one implementation, the HTUC 102 monitors the performance of the HDSLx link 606 using performance data obtained by the HTUC transceiver 128 of the HTUC 102. In another implementation, the HTUC 102 monitors the performance of the HDSLx link 606 and/or HDSLx link 607 using performance data obtained from the upstream HDSLx transceiver 616 and/or downstream HDSLx transceiver 628 of the doubler 670. In such an usage scenario, when the HTUC 102 determines, based on the performance data for the HDSLx link 606, that a non-intrusive transmitter adjustment should be made at the upstream HDSLx transceiver 616 and/or downstream HDSLx transceiver 628 of the doubler 670, the HTUC 102 sends a command to the doubler 670 requesting that the doubler 670 perform such an adjustment. The doubler 670, in response to receiving the command, performs the requested non-intrusive transmitter adjustment and sends a status message to the HTUC 102 indicating when the adjustment has completed.

In another usage scenario, the doubler 670 monitors the performance of the HDSLx link 606 and/or the HDSLx link 607 and causes the HTUC transceiver 128 of the HTUC 102 and/or the HTUR transceiver 148 of the HTUR 104 to perform a non-intrusive transmitter adjustment when appropriate based on the performance of the HDSLx link 606 and/or the HDSLx link 607. In another usage scenario, the doubler 670 monitors the performance of the HDSLx link 606 and/or the HDSLx link 607 and causes the upstream HDSLx transceiver 616 and/or downstream HDSLx transceiver 628 to perform a non-intrusive transmitter adjustment when appropriate based on the performance of the HDSLx link 606 or the HDSLx link 607. In yet another usage scenario, a device external to the transceiver units (for example, a network or element management application executing on a management workstation) monitors the HDSLx link 606 and/or the HDSLx link 607 and causes the upstream HDSLx transceiver 616 and/or downstream HDSLx transceiver 628 of the doubler 670, the HTUC transceiver 128 of the HTUC 102, and/or the HTUR transceiver 148 of the HTUR 104 to perform a non-intrusive transmitter adjustment when appropriate based on the performance of the HDSLx link 606 and/or the HDSLx link 607. In a similar manner, multiple spans including multiple doublers can be controlled.

The performance characteristics which are monitored to determine when to perform a Non-intrusive Transmitter Adjustment do not need to be limited to performance characteristics of the transceiver on the digital-subscriber-line. Any number of monitoring devices external to the digital-subscriber-line transceiver could be used to determine the performance quality of the digital-subscriber-line. As examples, devices could be use to measure crosstalk on the line, impedance of the line, foreign voltages on the line, AC power influence on the line, or transient events. The results from these measurements could be used to develop performance characteristics associated with the digital-subscriber-line. Changes in these performance characteristics could be used to trigger a Non-intrusive Transmitter Adjustment.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A first device for communicating over a digital-subscriber-line (DSL) link, comprising:
    a digital-subscriber-line transceiver to transmit and receive data over the DSL link, wherein a set of one or more performance parameters are associated with the DSL link by which the quality of the DSL link can be determined; and
    a controller coupled to the digital-subscriber-line transceiver, wherein the controller causes a non-intrusive transmitter adjustment operation to be performed by the digital-subscriber-line transceiver while DSL service is being provided over the DSL link, wherein the non-intrusive transmitter adjustment is non-intrusive with respect to the DSL link;
    wherein the first device communicates with a second device over the DSL link, wherein the controller causes the non-intrusive transmitter adjustment operation to be performed by the digital-subscriber-line transceiver in response to a request transmitted from a third device; and
    wherein the third device comprises a management client executing a management application, wherein a management server running on the first device is responsive to the management client.

2. The first device of claim 1, wherein the controller causes the non-intrusive transmitter adjustment operation to be performed by the digital-subscriber-line transceiver in response to a request transmitted from a second device.

3. The first device of claim 2, wherein the request is transmitted from the second device over the DSL link.

4. The first device of claim 3, wherein the controller communicates to the second device, over the DSL link, whether the non-intrusive transmitter adjustment operation was successfully performed by the first device.

5. The first device of claim 1, wherein the third device monitors the DSL link performance parameters and causes the non-intrusive transmitter adjustment operation to be performed by the digital-subscriber-line transceiver in response to such monitoring.

6. The first device of claim 5, wherein the first device communicates DSL link performance parameters to the third device, wherein the third device monitors the DSL link using the DSL link performance parameters.

7. The first device of claim 1, wherein the non-intrusive transmitter adjustment operation comprises at least one of: reducing the transmit power of the digital-subscriber-line transceiver, increasing the transmit power of the digital-subscriber-line transceiver, and updating precoder coefficients used by the digital-subscriber-line transceiver.

8. The first device of claim 1, wherein the controller monitors the DSL link performance parameters and causes the non-intrusive transmitter adjustment operation to be performed by the digital-subscriber-line transceiver in response to such monitoring.

9. A method comprising:
    monitoring at least one performance parameter of a digital-subscriber-line link;
    determining when a predetermined performance condition for the digital-subscriber-line link exists, wherein the predetermined performance condition is a function of the at least one performance parameter; and
    when the predetermined performance condition exists for the digital-subscriber-line link, performing a non-intrusive transmitter adjustment operation at a transceiver that communicates over the digital subscriber-line link while digital-subscriber-line service is being provided over the digital-subscriber-line link, wherein the non-intrusive transmitter adjustment is non-intrusive with respect to the digital-subscriber-line link;
    wherein the at least one performance parameter of the digital-subscriber-line link is monitored by at least one of the first device, the second device, and a device other than the first and second devices; and wherein the device other than the first and second devices comprises a management client executing a management application, wherein a management server running on the first and/or second device is responsive to the management client.

10. The method of claim 9, wherein the non-intrusive transmitter adjustment operation comprises at least one of: adjusting the transmit power of the transceiver and updating precoder coefficients of the transceiver.

11. The method of claim 9, wherein a first device and a second device communicate over the digital-subscriber-line link.

12. The method of claim 11, wherein the first device comprises at least one of a digital-subscriber-line transceiver unit and a doubler.

13. The method of claim 11, wherein the second device comprises at least one of a digital-subscriber-line transceiver unit and a doubler.

14. The method of claim 11, wherein when the predetermined performance condition for the digital-subscriber-line link exists is determined by at least one of the first device, the second device, and a device other than the first and second devices.

15. The method of claim 14, wherein the device other than the first and second devices comprises a management client executing a management application, wherein a management server running on the first and/or second device is responsive to the management client.

16. The method of claim 11, wherein the transceiver is located in one of the first device, the second device, and a device other than the first and second devices.

17. The method of claim 9, wherein the performance parameter is based on at least one of a cyclic redundancy check related to the DSL link, a loss of sync word related to the DSL link, loop attenuation of the DSL link, and a signal-to-noise ratio margin.

18. The method of claim 9, wherein the performance parameter is based on line conditions not directly associated with the DSL link performance, including:
crosstalk measurements;
line impedance measurements;
foreign voltage measurements;
AC power influence measurements; and
transient event measurements.

19. A method comprising:
monitoring at least one performance parameter of a digital-subscriber-line link;
determining when a predetermined performance condition for the digital-subscriber-line link exists, wherein the predetermined performance condition is a function of the at least one performance parameter; and
when the predetermined performance condition exists for the digital-subscriber-line link, performing a non-intrusive transmitter adjustment operation at a transceiver that communicates over the digital subscriber-line link while digital-subscriber-line service is being provided over the digital-subscriber-line link, wherein the non-intrusive transmitter adjustment is non-intrusive with respect to the digital-subscriber-line link;
wherein the at least one performance parameter of the digital-subscriber-line link comprises a signal-to-noise ratio margin of the digital-subscriber-line link;
wherein determining when the predetermined performance condition for the digital-subscriber-line link exists comprises determining if the signal-to-noise ratio margin of the digital-subscriber-line link is below a minimum signal-to-noise rate margin threshold; and
wherein performing the non-intrusive transmitter adjustment operation comprises:
determining if a transmit power of a transceiver that communicates over the digital-subscriber-line link can be increased;
if the transmit power of the transceiver can be increased, increasing the transmit power of the transceiver; and
if the transmit power of the transceiver can not be increased, performing a non-intrusive retraining operation at the transceiver.

20. The method of claim 19, wherein performing the non-intrusive transmitter adjustment operation comprises repeatedly performing the non-intrusive transmitter adjustment operation until the signal-to-noise ratio margin of the high-speed DSL link improves or until the non-intrusive retraining operation has been performed a predetermined number of times.

21. The method of claim 19, further comprising performing a full retrain at the high-speed digital-subscriber-line transceiver when the non-intrusive retraining operation is unsuccessful.

22. A method comprising:
monitoring at least one performance parameter of a digital-subscriber-line link;
determining when a predetermined performance condition for the digital-subscriber-line link exists, wherein the predetermined performance condition is a function of the at least one performance parameter; and
when the predetermined performance condition exists for the digital-subscriber-line link, performing a non-intrusive transmitter adjustment operation at a transceiver that communicates over the digital subscriber-line link while digital- subscriber-line service is being provided over the digital-subscriber-line link, wherein the non-intrusive transmitter adjustment is non-intrusive with respect to the digital-subscriber-line link;
wherein the at least one performance parameter of the digital-subscriber-line link comprises an errored seconds count of the digital-subscriber-line link;
wherein determining when the predetermined performance condition for the digital-subscriber-line link exists comprises determining if the errored second count of the digital-subscriber-line link exceeds an errored second threshold; and
wherein performing the non-intrusive transmitter adjustment operation comprises:
determining if a transmit power of a transceiver that communicates over the digital-subscriber-line link can be increased;
if the transmit power of the transceiver can be increased, increasing the transmit power of the transceiver; and
if the transmit power of the transceiver can not be increased, performing a non-intrusive retraining operation at the transceiver.

23. The method of claim 22, wherein performing the non-intrusive transmitter adjustment operation comprises repeatedly performing the non-intrusive transmitter adjustment operation until the errored seconds (ES) count of the high-speed DSL link improves or until the non-intrusive retraining operation has been performed a predetermined number of times.

24. The method of claim 22, further comprising performing a full retrain at the high-speed digital-subscriber-line transceiver when the non-intrusive retraining operation is unsuccessful.

25. A first device for communicating over a digital-subscriber-line (DSL) link, comprising:
a digital-subscriber-line transceiver to transmit and receive data over the DSL link; and
a controller coupled to the digital-subscriber-line transceiver, wherein the controller:
monitors at least one performance parameter of the DSL link;
determines when a predetermined performance condition exists, wherein the predetermined performance condition is a function of the at least one performance parameter; and
when the predetermined performance condition exists, causes a non-intrusive transmitter adjustment operation to be performed while DSL service is being provided over the DSL link, wherein the non-intrusive transmitter adjustment is non-intrusive with respect to the DSL link;
wherein the DSL link comprises a high-speed, symmetric DSL link;
wherein a high-speed digital-subscriber-line 4 (HDSL4) circuit is provisioned using two DSL links, wherein the controller:
monitors the at least one performance parameter for each of the for each of the DSL links; and
when the predetermined performance condition exists for each of the DSL links, causes the non-intrusive transmitter adjustment operation to be performed for the respective DSL link.

26. The device of claim 25, wherein the device comprises at least one of a digital-subscriber-line transceiver unit and a doubler.

27. The device of claim 25, wherein the performance parameter is based on at least one of a cyclic redundancy check related to the DSL link, a loss of sync word related to the DSL link, loop attenuation of the DSL link, and a signal-to-noise ratio margin.

28. The device of claim 25, wherein the performance parameter is based on line conditions not directly associated with the DSL link performance, including:
crosstalk measurements;
line impedance measurements;
foreign voltage measurements;
AC power influence measurements; and
transient event measurements.

29. The device of claim 25, wherein causing the non-intrusive transmitter adjustment operation to be performed when the predetermined performance condition exists comprises causing the device to perform the non-intrusive transmitter adjustment operation.

30. The device of claim 25, wherein causing the non-intrusive transmitter adjustment operation to be performed when the predetermined performance condition exists comprises sending a message to a second device requesting that the second device perform the non-intrusive transmitter adjustment operation.

31. The device of claim 25, wherein the non-intrusive transmitter adjustment operation comprises updating precoder coefficients of a transceiver.

32. The device of claim 25, wherein the non-intrusive transmitter adjustment operation comprises adjusting the transmit power of a transmitter.

33. The device of claim 25, wherein the DSL link comprises a high-speed digital-subscriber-line 2 (HDSL2) link.

34. A first device for communicating over a digital-subscriber-line (DSL) link, comprising:
a digital-subscriber-line transceiver to transmit and receive data over the DSL link; and
a controller coupled to the digital-subscriber-line transceiver, wherein the controller:
monitors at least one performance parameter of the DSL link;
determines when a predetermined performance condition exists, wherein the predetermined performance condition is a function of the at least one performance parameter; and
when the predetermined performance condition exists, causes a non-intrusive transmitter adjustment operation to be performed while DSL service is being provided over the DSL link, wherein the non-intrusive transmitter adjustment is non-intrusive with respect to the DSL link;
wherein the DSL link comprises a high-speed, symmetric DSL link;
wherein a symmetric SHDSL circuit is provisioned using one or more DSL links, wherein the controller:
monitors the at least one performance parameter for each of the DSL links;
determines when the predetermined performance condition exists for each of the DSL links; and
when the predetermined performance condition exists for each of the DSL links, causes the non-intrusive transmitter adjustment operation to be performed for the respective DSL link.

35. The device of claim 25, wherein the DSL link comprises a high-speed, symmetric or assymetric DSL link.

36. The device of claim 35, wherein the non-intrusive transmitter adjustment is limited to a transmit power adjustment.

37. A first device for communicating over a digital-subscriber-line (DSL) link, comprising:
a digital-subscriber-line transceiver to transmit and receive data over the DSL link; and
a controller coupled to the digital-subscriber-line transceiver, wherein the controller:
monitors at least one performance parameter of the DSL link;
determines when a predetermined performance condition exists, wherein the predetermined performance condition is a function of the at least one performance parameter; and
when the predetermined performance condition exists, causes a non-intrusive transmitter adjustment operation to be performed while DSL service is being provided over the DSL link, wherein the non-intrusive transmitter adjustment is non-intrusive with respect to the DSL link;
wherein the non-intrusive transmitter adjustment is limited to a transmit power adjustment
wherein an ADSL (including ADSL, ADSL2, ADSL2+, and other ADSL variants) circuit is provisioned using one or more DSL links, wherein the controller:
monitors the at least one performance parameter for each of the DSL links;
determines when the predetermined performance condition exists for each of the DSL links; and
when the predetermined performance condition exists for each of the DSL links, causes the non-intrusive transmitter adjustment operation to be performed for the respective DSL link.

38. A first device for communicating over a digital-subscriber-line (DSL) link, comprising:
- a digital-subscriber-line transceiver to transmit and receive data over the DSL link, and
- a controller coupled to the digital-subscriber-line transceiver, wherein the controller:
  - monitors at least one performance parameter of the DSL link;
  - determines when a predetermined performance condition exists, wherein the predetermined performance condition is a function of the at least one performance parameter; and
  - when the predetermined performance condition exists, causes a non-intrusive transmitter adjustment operation to be performed while DSL service is being provided over the DSL link, wherein the non-intrusive transmitter adjustment is non-intrusive with respect to the DSL link;
- wherein the non-intrusive transmitter adjustment is limited to a transmit power adjustment;
- wherein a VDSL (including VDSL, VDSL2, and other VDSL variants) circuit is provisioned using one or more DSL links, wherein the controller:
  - monitors the at least one performance parameter for each of the DSL links;
  - determines when the predetermined performance condition exists for each of the DSL links; and
  - when the predetermined performance condition exists for each of the DSL links, causes the non-intrusive transmitter adjustment operation to be performed for the respective DSL link.

39. A method, comprising:
- initially training two digital-subscriber-line (DSL) links over which a first device and a second device communicate, wherein a high-speed digital-subscriber-line 4 (HDSL4) circuit is provisioned using the two DSL links;
- after training the DSL links:
  - monitoring at least one performance parameter for each of the DSL links;
  - determining when a predetermined performance condition exists for each of the DSL links, wherein the predetermined performance condition is a function of the at least one performance parameter; and
  - when the predetermined performance condition exists for each of the DSL links, non-intrusively adjusting a transmit parameter of at least one of the first device and the second device while DSL service is being provided over the DSL links, wherein the non-intrusive transmitter adjustment is non-intrusive with respect to the DSL links.

40. The method of claim 39, wherein the first device comprises a first digital-subscriber-line transceiver unit, wherein the second device comprises a second digital-subscriber-line transceiver unit.

41. The method of claim 39, wherein the at least one performance parameter of the DSL link is monitored by the first device and wherein the first device determines when the predetermined performance condition exists, and the second device non-intrusively adjusts the transmit parameter of the second device.

42. The method of claim 41, wherein the first device comprises one of a central office high-speed digital-subscriber-line transceiver unit, a remote terminal high-speed digital-subscriber-line transceiver unit, and a doubler.

43. The method of claim 41, wherein the second device comprises one of a central office high-speed digital-subscriber-line transceiver unit, a remote terminal high-speed digital-subscriber-line transceiver unit, and a doubler.

44. The method of claim 43, wherein the DSL link comprises a high-speed, symmetrical DSL link.

45. The device of claim 43, wherein the DSL link comprises a high-speed, symmetric or assymetric DSL link.

46. The device of claim 45, wherein the non-intrusive transmitter adjustment is limited to a transmit power adjustment.

47. Apparatus comprising:
- means for monitoring at least one performance parameter of a digital-subscriber-line link;
- means for determining when a predetermined performance condition for the digital-subscriber-line link exists, wherein the predetermined performance condition is a function of the at least one performance parameter; and
- means for, when the predetermined performance condition exists for the digital-subscriber-line link exists, performing a non-intrusive transmitter adjustment operation at a transceiver that communicates over the digital subscriber-line link while digital subscriber-line service is being provided over the digital subscriber-line link, wherein the non-intrusive transmitter adjustment is non-intrusive with respect to the digital subscriber-line link;
- wherein the at least one performance parameter of the digital-subscriber-line link is monitored by at least one of the first device, the second device, and a device other than the first and second devices; and
- wherein the device other than the first and second devices comprises a management client executing a management application, wherein a management server running on the first and/or second device is responsive to the management client.

\* \* \* \* \*

UNITED STATES PATENT AND TRADEMARK OFFICE
CERTIFICATE OF CORRECTION

| | |
|---|---|
| PATENT NO. | : 7,668,230 B2 |
| APPLICATION NO. | : 11/145518 |
| DATED | : February 23, 2010 |
| INVENTOR(S) | : Kroninger et al. |

It is certified that error appears in the above-identified patent and that said Letters Patent is hereby corrected as shown below:

At Claim 25, Column 23, Line 29, delete "for each of the" (second occurrence)

At Claim 25, Column 23, Line 29, replace "and" with --determines when the predetermined performance condition exists for each of the DSL links; and--

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO.        : 7,668,230 B2                                           Page 1 of 1
APPLICATION NO. : 11/145518
DATED             : February 23, 2010
INVENTOR(S)       : Kroninger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1097 days.

Signed and Sealed this

Fourth Day of January, 2011

David J. Kappos
*Director of the United States Patent and Trademark Office*